US012663693B2

(12) United States Patent (10) Patent No.: US 12,663,693 B2

Uno et al. (45) Date of Patent: Jun. 23, 2026

(54) LIGHT SHIELDING UNIT AND LENS BARREL EQUIPPED WITH THE SAME

(71) Applicant: Panasonic Intellectual Property Management Co., Ltd., Osaka (JP)

(72) Inventors: Tetsuya Uno, Osaka (JP); Satoshi Fukuda, Osaka (JP); Hiroki Miyaji, Kochi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 302 days.

(21) Appl. No.: 18/367,312

(22) Filed: Sep. 12, 2023

(65) Prior Publication Data

US 2024/0094604 A1 Mar. 21, 2024

(30) Foreign Application Priority Data

Sep. 16, 2022 (JP) ................................. 2022-148218
Aug. 30, 2023 (JP) ................................. 2023-139751

(51) Int. Cl.
    *G03B 9/06* (2021.01)
    *G02B 7/02* (2021.01)
    *G03B 17/42* (2021.01)
(52) U.S. Cl.
    CPC .............. *G03B 9/06* (2013.01); *G02B 7/021* (2013.01); *G02B 7/026* (2013.01); *G03B 17/425* (2013.01)

(58) Field of Classification Search
    CPC ... G03B 9/00; G03B 9/02; G03B 9/04; G03B 9/06; G03B 9/07; G03B 9/10; G03B 9/26; G02B 17/425
    See application file for complete search history.

(56) References Cited

U.S. PATENT DOCUMENTS

| | | | | |
|---|---|---|---|---|
| 2008/0199177 A1* | 8/2008 | Ide | ........................... | G03B 9/06 |
| | | | | 396/510 |
| 2016/0139490 A1* | 5/2016 | Nakano | .................... | G03B 9/06 |
| | | | | 396/505 |
| 2019/0137845 A1* | 5/2019 | Yoshizawa | ............... | G03B 9/06 |
| 2020/0278590 A1* | 9/2020 | Nakada | ................ | G03B 17/425 |

FOREIGN PATENT DOCUMENTS

| | | |
|---|---|---|
| JP | 2016-102830 A | 6/2016 |
| JP | 2020-140059 A | 9/2020 |

* cited by examiner

*Primary Examiner* — Ephrem Z Mebrahtu
(74) *Attorney, Agent, or Firm* — Renner, Otto, Boisselle & Sklar, LLP

(57) ABSTRACT

An aperture unit comprises a base plate, a cover, a plurality of movable blades, a drive ring, a drive motor, and rotation shafts. The movable blades are disposed between the base plate and the cover, and adjust the amount of light passing through by varying the size of the opening by opening and closing operations. The drive ring is disposed between the base plate and the cover, is rotationally driven when the movable blades are opened and closed, and has a plurality of cam pins that move along cam grooves in the movable blades. The cover has protrusions that protrude toward the movable blades along the optical axis direction and restrict the movement of the movable blades in the optical axis direction.

18 Claims, 20 Drawing Sheets

21b,22b,23b,24b,25b

21

20

28

29b

LIGHT SHIELDING UNIT AND LENS BARREL EQUIPPED WITH THE SAME

BACKGROUND

Technical Field

The present disclosure relates to a light shielding unit and to a lens barrel equipped with this light shielding unit.

Description of the Related Art

A camera or other such imaging device is provided with a plurality of lens groups, an aperture that adjusts the surface area of an opening through which light passes, a shutter unit, and so forth.

For example, Patent Literature 1 discloses a blade drive device intended to reduce warping of a blade group, the blade drive device comprising a plurality of blades that are disposed in a ring shape around a light passage path, and a drive ring that rotates these blades, wherein each of the blades has an engaging portion that engages with a cam groove provided in the drive ring, and at least a portion of the cam groove is inclined toward the outside in the radial direction of the drive ring.

CITATION LIST

Patent Literature

Patent Literature 1: JP-A 2016-102830

SUMMARY

However, the following problem was encountered with the conventional light shielding unit described above.

Specifically, the light shielding unit disclosed in the above publication cannot truly be said to be small enough.

It is an object of the present disclosure to provide a light shielding unit that can be made smaller than in the past, as well as a lens barrel equipped with this light shielding unit.

Means for Solving Problem

The light shielding unit according to the first disclosure comprises a first frame, a second frame, a plurality of movable blades, a drive ring, a drive source, and a plurality of rotation shafts. The first frame has a substantially annular main body and a first opening that is provided to the center portion of the main body and allows light to pass through along the optical axis direction. The second frame has a substantially annular main body and a second opening that is provided to the center portion of the main body and allows light to pass through along the optical axis direction. The plurality of movable blades are disposed between the first frame body and the second frame body, form a third opening through which the light that has passed through the first aperture passes, and adjust the amount of light passing through by varying the size of the third opening by opening and closing operations, and each have a through-hole into which is inserted a rotation shaft serving as the center of rotation when performing opening and closing operations. The drive ring is disposed between the first frame and the second frame, and is rotationally driven when the movable blades are opened and closed. The drive source rotationally drives the drive ring around the optical axis. The rotation shafts are inserted into the through-holes in the movable blades and serve as the centers of rotation for the movable blades. The second frame further has a first protrusion that protrudes in the direction of the movable blades along the optical axis direction and restricts the movement of the movable blades in the optical axis direction.

The light shielding unit according to the second disclosure comprises a first frame, a second frame, a plurality of movable blades, a drive ring, and a drive source. The first frame has a substantially annular main body and a first opening that is provided to the center portion of the main body and allows light to pass through along the optical axis direction. The second frame has a substantially annular main body and a second opening provided to the center portion of the main body and allows light to pass through along the optical axis direction. The plurality of movable blades are disposed between the first frame body and the second frame body, form a third opening through which the light that has passed through the first aperture passes, and adjust the amount of light passing through by varying the size of the third opening by opening and closing operations. The drive ring is disposed between the first frame and the second frame, and is rotationally driven when the movable blades are opened and closed. The drive source rotationally drives the drive ring around the optical axis. The first frame further has a first convex portion that conforms to the external shape on the outside in the radial direction of a circle centered on the optical axis of the movable blades in a state in which the third opening is reduced to its smallest size by the rotation of the movable blades when the drive ring is rotationally driven by the drive source.

The light shielding unit according to the third disclosure comprises a first frame, a second frame, a plurality of movable blades, a drive ring, and a drive source. The first frame has a substantially annular main body and a first opening that is provided to the center portion of the main body and allows light to pass through along the optical axis direction. The second frame has a substantially annular main body and a second opening that is provided to the center portion of the main body and allows light to pass through along the optical axis direction. The plurality of movable blades are disposed between the first frame and the second frame, form a third opening through which the light that has passed through the first opening passes, and adjust the amount of light passing through by varying the size of the third opening by opening and closing operations. The drive ring is disposed between the first frame and the second frame, and is rotationally driven when the plurality of movable blades are opened and closed. The drive source rotationally drives the drive ring around the optical axis. The first frame further has a first concave portion that conforms to the external shape on the outside in the radial direction of a circle centered on the optical axis of the movable blades in a state in which the third opening is reduced to its smallest size by the rotation of the movable blades when the drive ring is rotationally driven by the drive source.

(Effects)

The aperture unit according to the present disclosure can be made smaller than in the past.

Figure 5B:
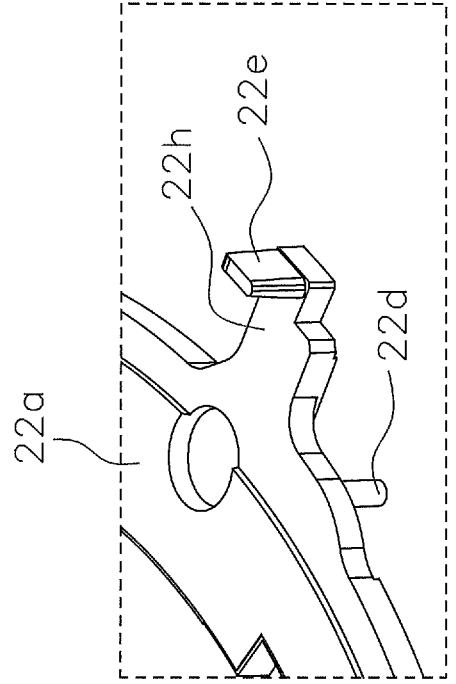
FIG. 5B is a detail view of the B portion in FIG. 5A.
Figure 5A:
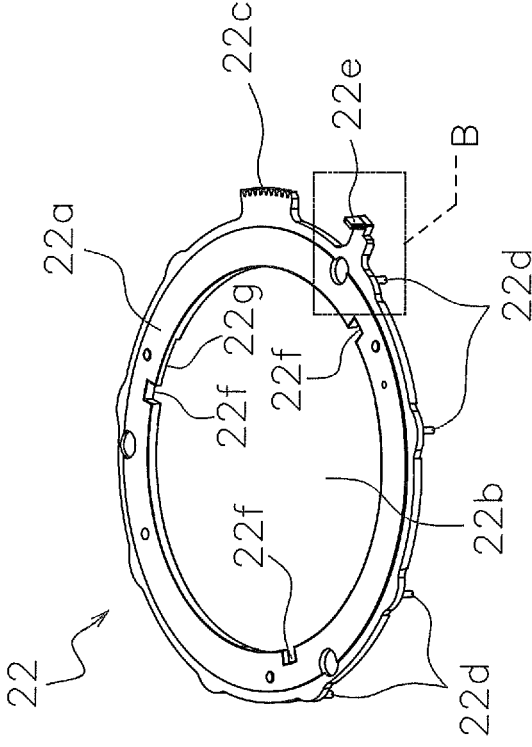
FIG. 5A is an oblique view of the configuration of a drive ring included in the aperture unit of FIG. 2.
Figure 10:
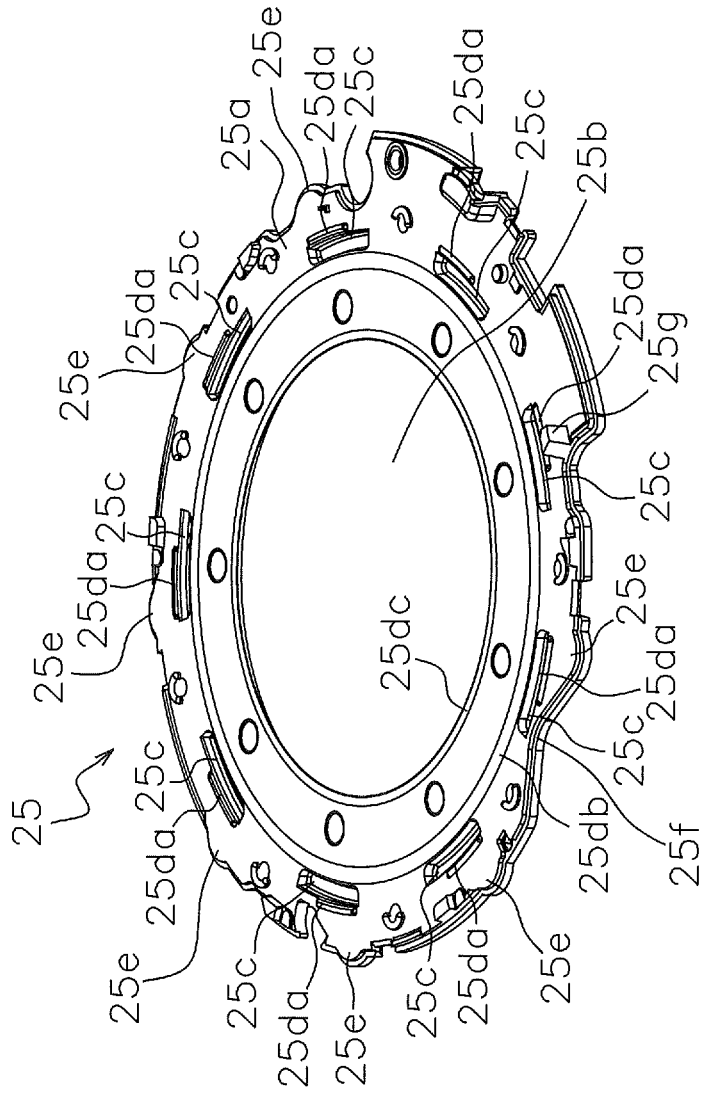
FIG. 10 is an oblique view of the configuration of a cover included in the aperture unit of FIG. 2.
Figure 19B:
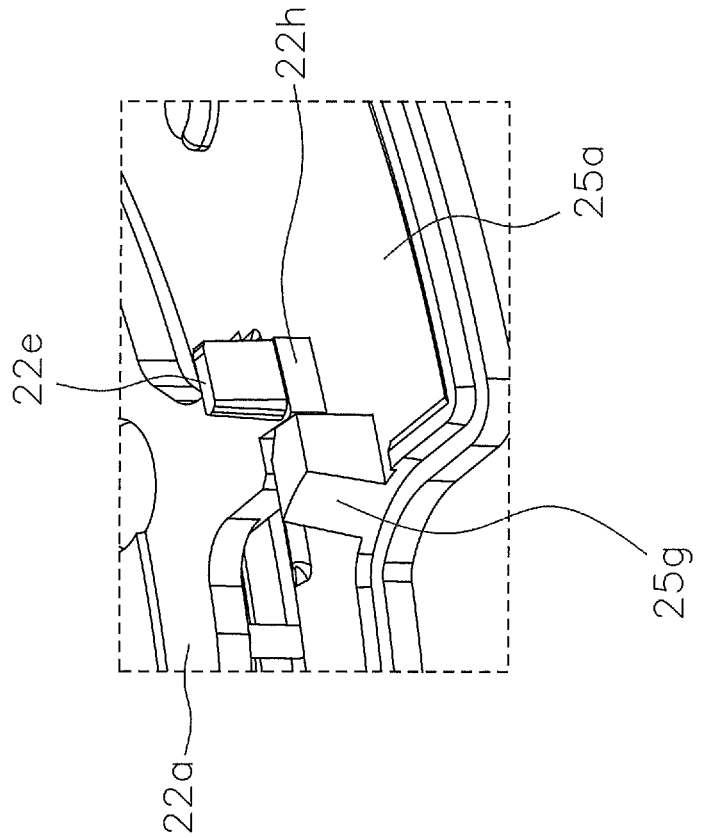
Figure 19A:
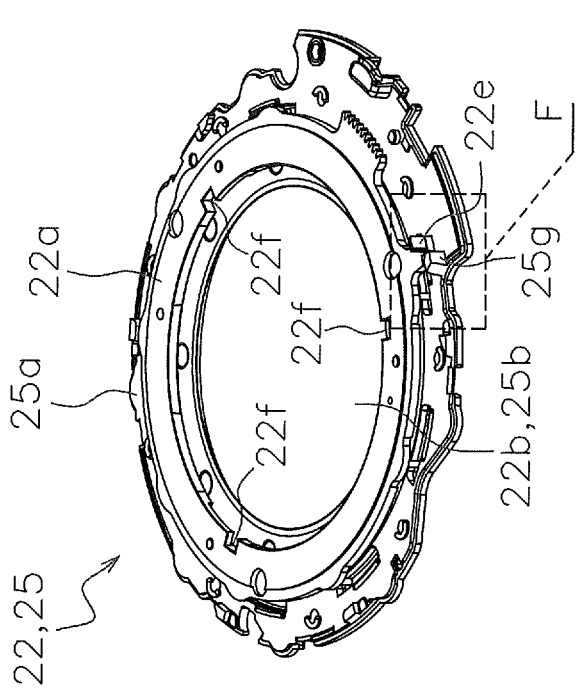
Figure 20B:
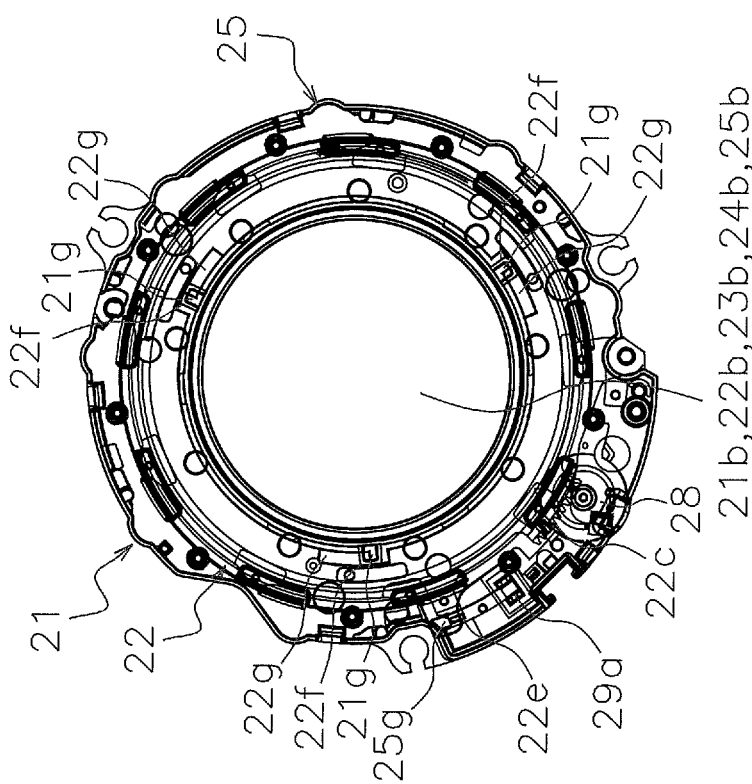
Figure 20A:
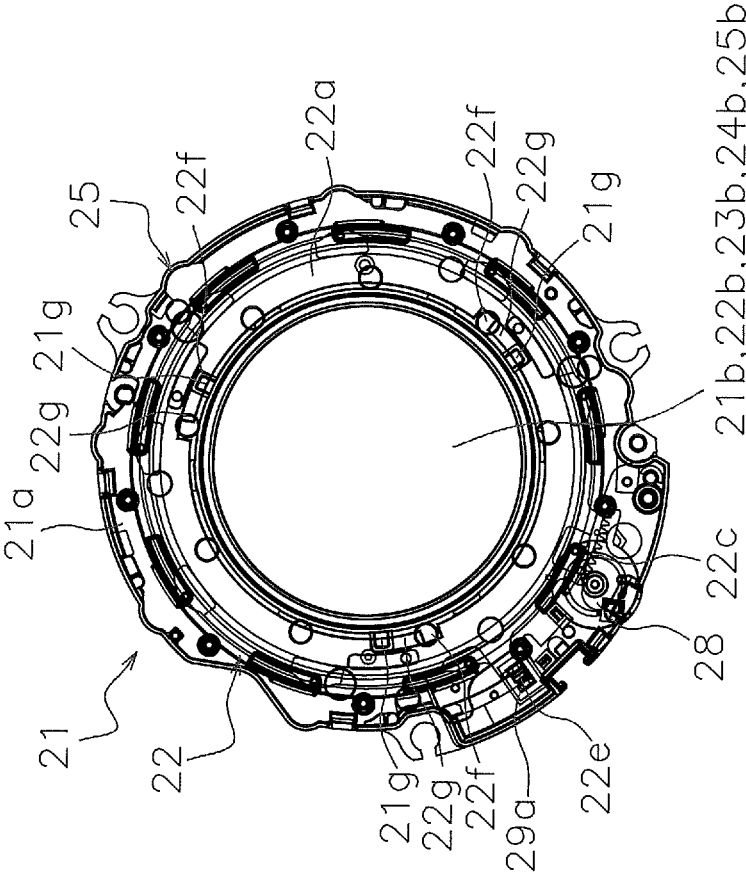

10 have been assembled and the drive ring rotates to maximize (open) the opening of the aperture unit;

FIG. 19A is an oblique view showing the positional relation (phase) when the drive ring of FIG. 5A and the cover of FIG. 10 have been assembled and the drive ring rotates to minimize the opening of the aperture unit (to the minimum aperture side);

FIG. 19B is a detail view of the F portion in FIG. 19A;

FIG. 20A is a perspective view showing the phase of the drive ring in FIG. 5A when the opening of the aperture unit is maximized (open state); and FIG. 20B is a perspective view showing the phase of the drive ring in FIG. 5A when the opening of the aperture unit is minimized (small aperture state).

DETAILED DESCRIPTION OF THE EMBODIMENT

Embodiments pertaining to this disclosure will now be described through reference to the drawings. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Figure 1:
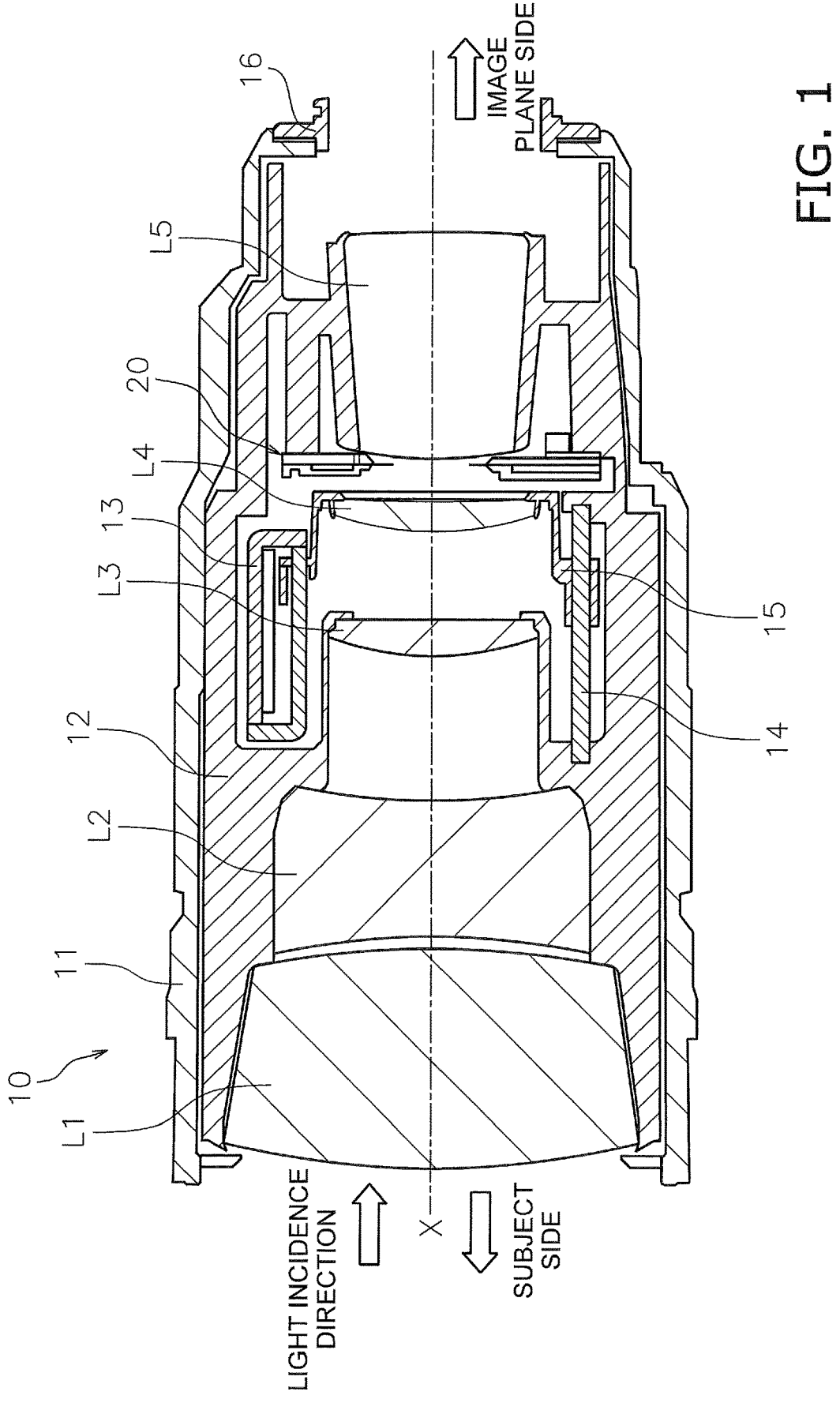
FIG. 1 is a cross-sectional view of the configuration of a lens barrel including the aperture unit according to an embodiment of the present disclosure.

FIG. 1 shows the "subject side," "image side," and "light incidence direction" described in the text. The "image plane side" and the "opposite side from the subject side" are the same side.

Embodiment 1

The aperture unit (light shielding unit) 20 and the lens barrel 10 comprising the same according to an embodiment of the present disclosure will now be described using FIGS. 1 to 20B.

(1) Configuration of Lens Barrel 10

The lens barrel 10 according to this embodiment is an exchangeable lens barrel that is mounted on a camera body (not shown), and as shown in FIG. 1, comprises an outer frame 11, an inner frame 12, an actuator 13, It includes a guide pole 14, a fourth lens frame 15, a mount 16, a first lens L1 to a fifth lens L5, and an aperture unit 20. X is the optical axis defined by the first lens L1 to the fifth lens L5. The optical axis X will in some cases be defined by only one lens, such as the first lens L1.

The outer frame 11 is a substantially cylindrical member, constitutes the outer contour of the lens barrel 10, and surrounds the various components such as the first lens L1 to the fifth lens L5.

The inner frame 12 is disposed on the inner peripheral surface side of the outer frame 11, and holds the first lens L1 on the farthest upstream side in the light incidence direction, the second lens L2 on the downstream side thereof, and the third lens L3 on the downstream side thereof. Furthermore, the inner frame 12 holds the actuator 13 and the guide pole 14 somewhat to the side of the third lens L3, with the fourth lens being held movably in the optical axis X direction by the guide pole 14 on the downstream side of the third lens L3, the aperture unit 20 on the downstream side thereof, and the fifth lens L5 on the downstream side thereof.

The actuator 13 is a focus motor that is driven for focusing, and is held by the inner frame 12. When the actuator 13 is supplied with power from an electric circuit (not shown), it moves the fourth lens frame 15 holding the fourth lens (focus lens) L4 back and forth in the optical axis X direction along the guide pole 14.

The guide pole 14 is a rod-like member that guides the fourth lens frame 15, which is driven by the actuator 13, back and forth in the optical axis X direction. The guide pole 14 is held by the inner frame 12 and disposed parallel to the optical axis X direction.

The fourth lens frame 15 is included in a lens group constituting the optical system of the lens barrel 10, and moves in the optical axis X direction to adjust the focus of the light beam incident on the lens. The fourth lens frame 15 holds the fourth lens L4 and is driven by the actuator 13.

Alternatively, the fourth lens frame 15 holds the fourth lens L4, which moves in the optical axis X direction, and is driven in conjunction with a zoom operation, in order to adjust the focal length of the light beam incident on the lens, that is, for zooming. That is, the fourth lens frame 15 can be moved in the optical axis direction for focusing or zooming.

The mount 16 is a part that is mounted to a camera body (not shown), is held by the outer frame 11, and is disposed the furthest downstream in the direction of light incidence within the lens barrel 10.

As shown in FIG. 1, the first lens L1 to the fifth lens L5 are an optical system that guides light in the optical axis X direction, and are disposed in that order, from the subject side to the image plane side in the light incidence direction.

The first lens L1 is disposed closer to the subject than any of the other lenses in the lens group included in the lens barrel 10.

The second lens L2 is disposed inside the inner frame 12 at a position close to the surface of the first lens L1 on the image plane side (opposite from the subject side).

The third lens L3 is disposed inside the inner frame 12 at a position a specific distance away from the second lens L2 toward the image plane side.

The fourth lens L4 is a focus lens provided inside the inner frame 12, can be moved back and forth in the optical axis X direction by the actuator 13, and is held by the fourth lens frame 15.

The fifth lens L5 is disposed on the downstream side of the aperture unit 20 in the optical axis X direction and closer to the image plane side than any of the other lenses in the lens group included in the lens barrel 10.

The aperture unit (light shielding unit) 20 is disposed between the fourth lens L4 and the fourth lens frame 15 on the inside of the inner frame 12, and the fifth lens L5 and the inner frame 12, and adjusts the amount of light incident on the image sensor provided on the camera body side by adjusting the surface area or the opening diameter through which passes the light transmitted through first lens L1 to the fourth lens L4. The detailed configuration of the aperture unit 20 will be described in detail below.

(2) Configuration of Aperture Unit 20

With the lens barrel 10 of this embodiment, as shown in FIG. 1, the first lens L1 to the fourth lens L4 are disposed closer to the subject than the aperture unit 20 in the optical axis X direction.

Figure 2:
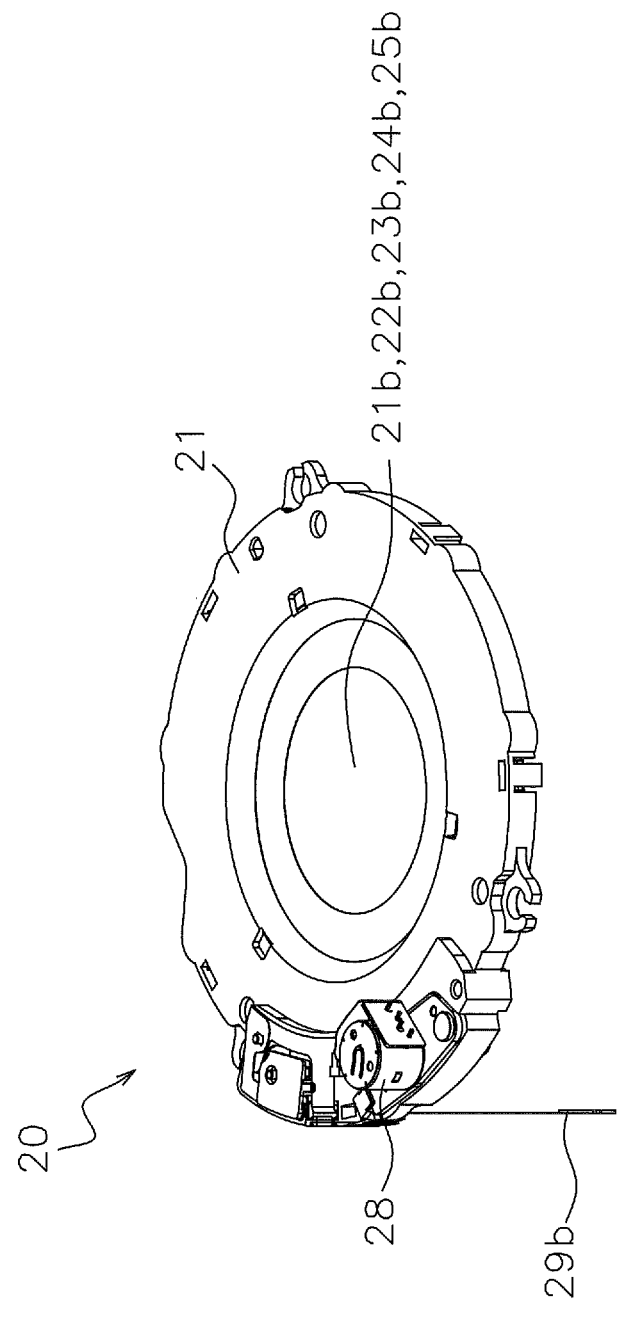
FIG. 2 is an external oblique view of the configuration of an aperture unit included in the lens barrel of FIG. 1.

As shown in FIG. 1, the aperture unit 20 is disposed downstream of the fourth lens L4, which functions as a focus lens. As shown in FIG. 2, the aperture unit 20 adjusts the amount of light passing through openings (aperture openings) 21b, 22b, 23b, 24b, and 25b formed at the center of each substantially annular member, by rotating the plurality of aperture blades 24 (see FIG. 3) with the drive motor 28 to open and close the opening 24b. The centers of the openings 21b, 22b, 23b, 24b, and 25b and the opening of the aperture unit 20 are configured to substantially pass through the optical axis X.

Figure 3:
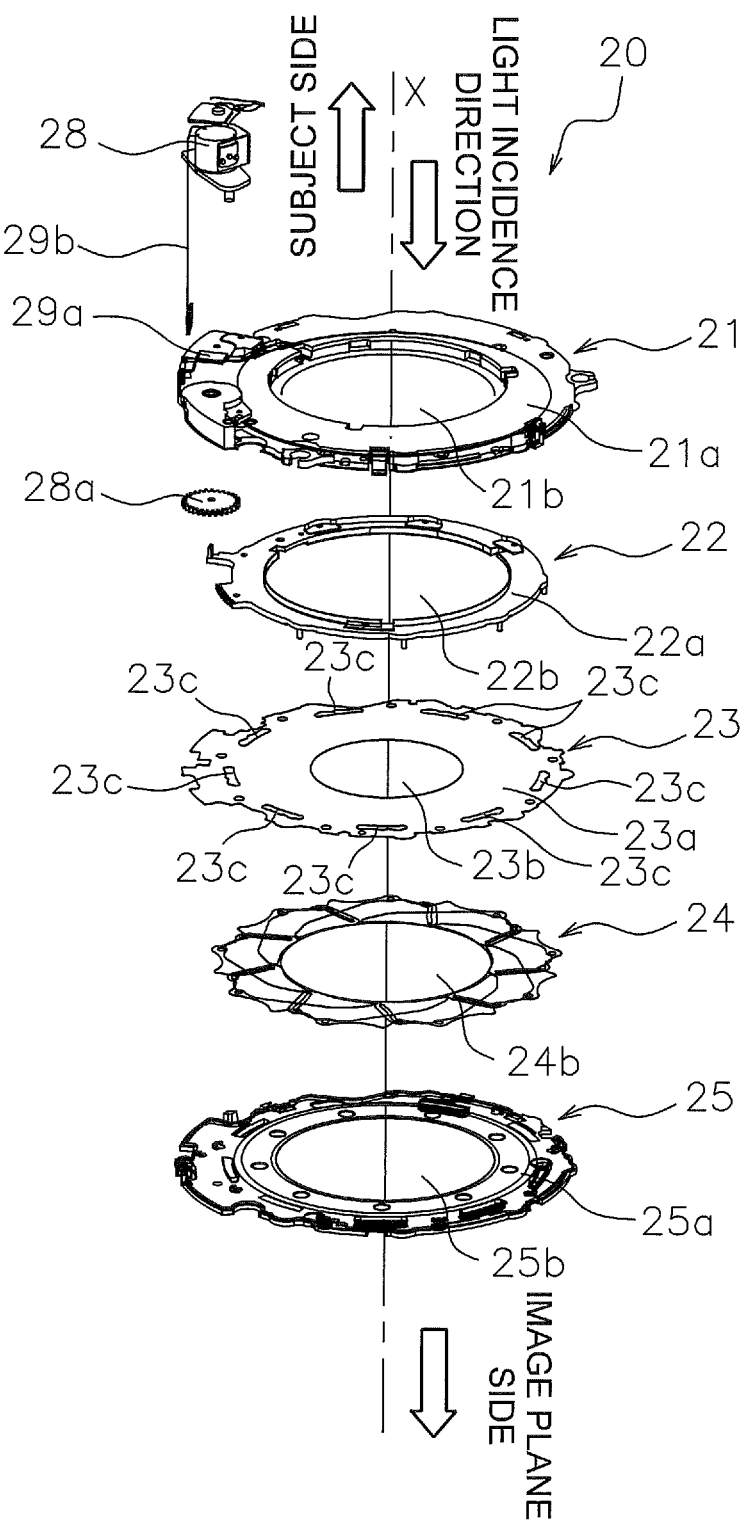
FIG. 3 is an exploded oblique view of the component configuration of the aperture unit of FIG. 2.

As shown in FIGS. 2 and 3, the aperture unit 20 has a base plate (first frame) 21, a drive ring 22, an aperture sheet 23, a plurality of aperture blades (movable blades) 24, a cover (second frame) 25, a drive motor (drive source) 28, a photointerrupter (position sensing unit) 29a, and an FPC (flexible printed circuits) 29b.

Figure 9B:
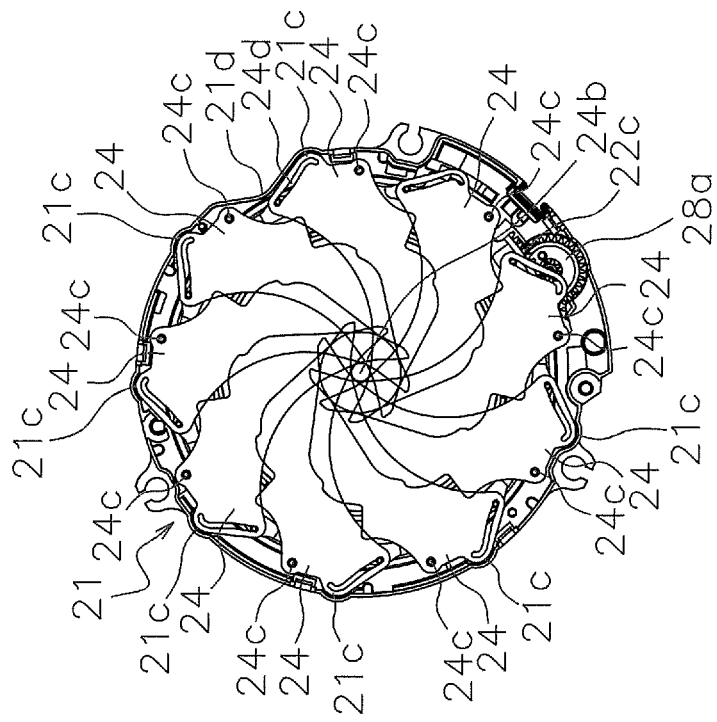
FIG. 9B is a plan view showing the positional relation between the movable blades and the base plate when the size of the opening of the aperture unit in FIG. 2 is at its minimum.

In the aperture unit 20, when the aperture blades 24 are at full constriction (minimum aperture state), the opening diameter (surface area) of the opening (third opening) 24b formed by the aperture blades 24 is at its minimum (see FIG. 9B).

Also, when the aperture blades 24 are rotated from the state in which the opening diameter (surface area) of the opening 24b is at its minimum, the opening diameter (surface area) of the opening 24b formed by the aperture blades 24 gradually increases.

Figure 9A:
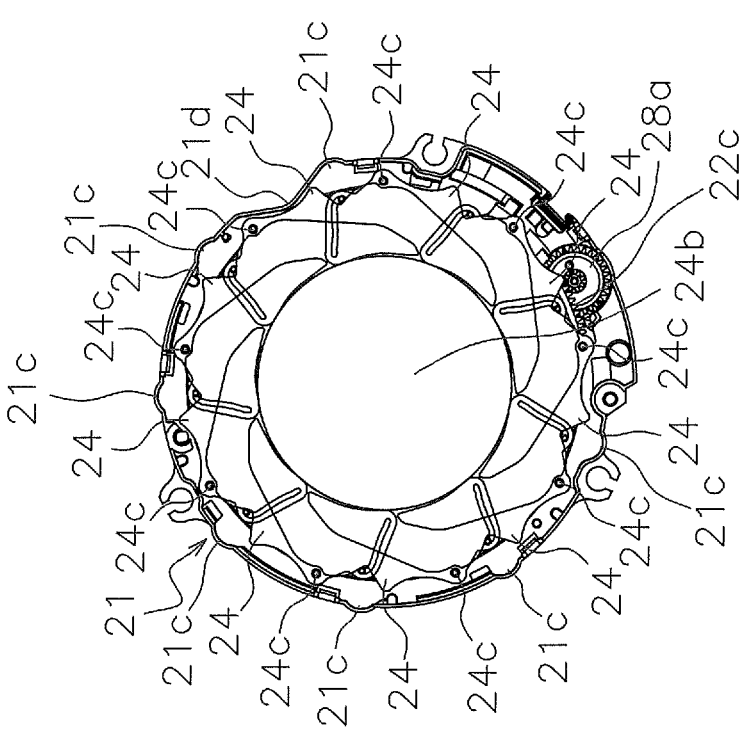
FIG. 9A is a plan view showing the positional relation between the movable blades and the outer shape of the base plate in a state in which the size of the opening of the aperture unit in FIG. 2 is at its maximum.

When the aperture blades 24 are further rotated, the aperture blades 24 go entirely into the gap between the base plate 21, the cover 25, etc., and the opening diameter (surface area) of the opening 24b formed by the aperture blades 24 reaches its maximum (see FIG. 9A).

When the opening diameter or opening surface area of the opening 24b formed by the aperture blades 24 is at its maximum (open aperture state), the size of the open portion of the aperture unit 20 is defined by the aperture sheet 23 (discussed below). That is, the opening 23b of the aperture sheet 23 is constant and is smaller than the opening 24b of the aperture blades 24 when in their maximum opening diameter or opening surface area.

As described above, the aperture unit 20 in this embodiment adjusts the amount of light passing through the open portion by rotating the aperture blades 24 between the open and closed states of the opening 24b.

As shown in FIG. 3, the base plate (first frame body) 21 is a substantially annular member disposed closest to the subject in the direction of light incidence, and has a substantially annular main body portion 21a and an opening (first opening) 21b formed in the center of the main body portion 21a to allow incident light to pass through from the subject side. As shown in FIG. 3, the drive ring 22, the aperture sheet 23, and the aperture blades 24 are disposed in that order, starting from the subject side, between the base plate 21 and the cover 25 disposed the furthest downstream in the light incidence direction.

The detailed configuration of the base plate 21 will be described below in detail.

As shown in FIG. 3, the drive ring 22 is a substantially annular member disposed between the base plate 21 and the aperture sheet 23 in the light incidence direction, and has a substantially annular main body portion 22a and an opening 22b formed in the center. The drive ring 22 is rotationally driven around the optical axis X by the drive motor 28 (discussed below) to rotate the aperture blades 24.

The detailed configuration of the drive ring 22 will be described below in detail.

As shown in FIG. 3, the aperture sheet 23 is a substantially annular member disposed between the drive ring 22 and the aperture blades 24 in the light incidence direction, and has a substantially annular main body portion 23a and an opening 23b formed in the center. The aperture sheet 23 has through-grooves 23c of substantially the same shape, in the portions overlapping concave portions 25c (see FIGS. 10 and 13) formed in the cover 25 disposed on the downstream side in the light incidence direction. Also, the aperture sheet 23 is provided in order to define the diameter, surface area, or size of the opening portion when the aperture unit 20 is in its fully open state.

Also, the surface of the aperture sheet 23 that is in contact with the aperture blades 24 has a coating that reduces friction so that the aperture blades 24 will rotate smoothly.

The aperture blades (movable blades) 24 are disposed so as to be sandwiched between the aperture sheet 23 and the cover 25 in the light incidence direction. The aperture blades 24 are rotated around rotation shafts 21e (see FIG. 4A) provided on the base plate 21, between the aperture sheet 23 and the cover 25, so as to vary the size (surface area) of the opening 24b and adjust the amount of light passing through the open portion of the aperture unit 20.

The detailed configuration of the aperture blades 24 will be described below in detail.

As shown in FIG. 3, the cover (second frame body) 25 is a substantially annular member disposed on the downstream side of the aperture blades 24 in the light incidence direction, and has a substantially annular main body portion 25a and an opening 25b.

The detailed configuration of the cover 25 will be described below in detail.

The drive motor 28 is provided in order to apply a drive force to the aperture blades 24 when opening and closing the aperture blades 24, and is fixed to the base plate 21. The drive motor 28 is electrically connected to the FPC 29b (discussed below), and has a rotation shaft rotated by power supplied from an electrical circuit (not shown).

More specifically, in the drive motor 28, a reduction gear 28a meshes with a pinion gear (not shown) press-fitted to a rotation shaft. The reduction gear 28a is a stepped gear in which a small gear with few teeth and a large gear with many teeth are integrated (not shown). The pinion gear meshes with the large gear of the reduction gear 28a, and the small gear of the reduction gear 28a meshes with a gear portion 22c of the drive ring 22. When the rotation shaft of the drive motor 28 rotates in this state, the reduction gear 28a (a stepped gear) rotates, and the drive ring 22 rotates around the optical axis X while being decelerated by the stepped gear.

The photointerrupter 29a has a light emitting part and a light receiving part, detects that the light shielding blade 22e of the drive ring 22 has passed between the light emitting part and the light receiving part, and outputs a reference signal for detecting the rotational position of the drive ring 22. Based on this reference signal, the drive motor 28 is rotationally controlled by a control circuit (not shown), and the rotational position of the drive ring 22 is determined as needed. When the rotational position of the drive ring 22 is determined, the opening diameter (surface area) of the opening (third opening) 24b formed by the aperture blades 24 is determined. The photointerrupter 29a is disposed at a position where the light emitting part and the light receiving part are opposite the light shielding blade 22e of the drive ring 22, and is fixed to the main body portion 21a of the base plate 21. The photointerrupter 29a is soldered to the FPC 29b by a known reflow method, and is fixed to the base plate 21 by fixing the FPC 29b to the upper surface (subject side surface) of the main body portion 21a of the base plate 21.

The FPC 29b is a flexible printed circuit board, and as shown in FIGS. 2 and 3, electrically connects the photointerrupter 29a and the drive motor 28, and is connected to an electric circuit (not shown) via a connector. The FPC 29b is attached to the upper surface (subject-side surface) of the base plate 21 in a state in which the photointerrupter 29a has been soldered.

(2-1) Base Plate 21

Figure 4B:
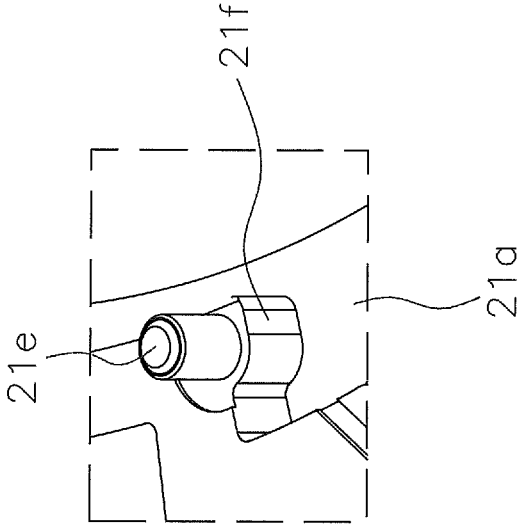
FIG. 4B is a detail view of the A portion in FIG. 4A.
Figure 4A:
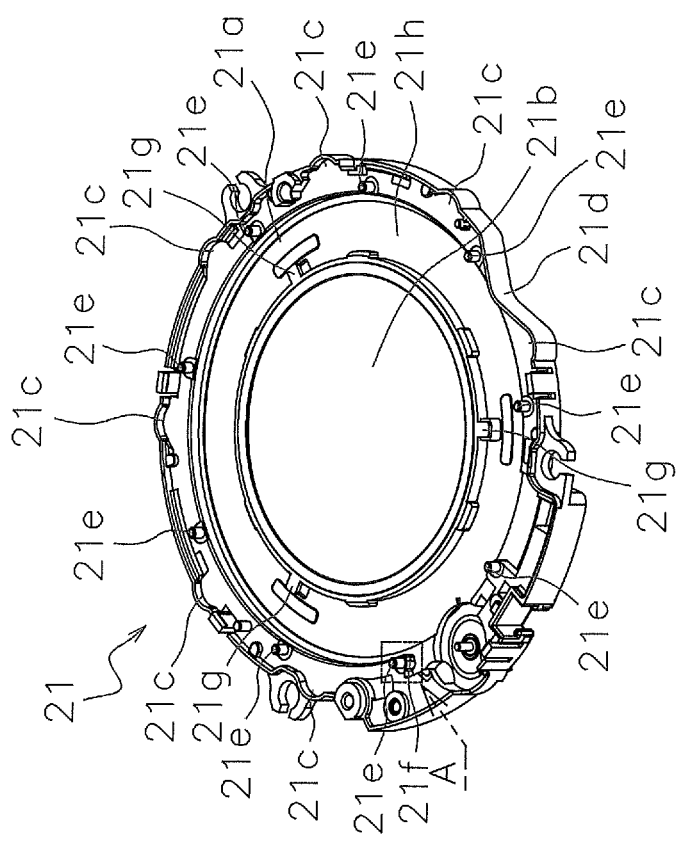
FIG. 4A is an oblique view of the configuration of a base plate included in the aperture unit of FIG. 2.

As shown in FIG. 4A, the base plate (first frame body) 21 has a main body portion 21a, an opening (first opening) 21b, convex portions (first convex portions) 21c, a concave portion (first concave portion) 21d, rotation shafts 21e, a stopper 21f, latching portions 21g, and an annular recess 21h.

Also, as shown in FIG. 2, etc., the drive motor 28, etc., for providing drive force for opening and closing the aperture blades 24 is disposed on the surface of the base plate 21 on the subject side.

As shown in FIG. 4A, the main body portion 21a is a substantially annular plate-like member, forms the outer shape of the aperture unit 20, and has an opening 21b formed in the center thereof.

The opening 21b is an open portion through which light incident from the subject side of the lens barrel 10 passes, and its diameter or surface area is approximately equal to or slightly larger than that of the opening 24b formed when the aperture blades 24 are fully open. The opening 21b has a diameter or surface area that is approximately equal to or larger than the opening 23b of the aperture sheet 23 (discussed below).

As shown in FIG. 4A, the convex portions (first convex portions) 21c are formed so that a portion protrudes outward in the radial direction from the outer peripheral portion of the approximately circular outer shape centered on the optical axis X of the main body portion 21a. In other words, the outer shape of the main body portion of the base plate 21 is formed by a portion with a small outside diameter centered on the optical axis (that is, the approximately circular outer shape centered on the optical axis X) and a portion with a large outside diameter (that is, the first convex portions 21c). More precisely, when the drive ring 22 is rotationally driven by the drive motor 28 and the aperture blades 24 are rotated so that the opening 24b is at its smallest size (see FIG. 9B), the first convex portions 21c are formed along the outer shape on the outside in the radial direction of a circle centered on the optical axis X of the aperture blades 24.

As will be discussed below, when the opening 24b is at its smallest size, the amount of protrusion of cam grooves 24d outward in the radial direction of a circle centered on the optical axis X reaches its maximum, and the amount of protrusion outward in the radial direction of the outer shape of the aperture blades 24, which are substantially parallel to the cam grooves 24d, also reaches its maximum. The shape of the convex portions 21c is formed to match the outer shape of the apertures blade 24 in this state, that is, along the outer shape, and the convex portions 21c are formed protruding from the outer shape of the main body portion 21a of the base plate 21, which is an approximately circular shape centered on the optical axis X.

The cam grooves 24d of the aperture blades 24 are formed such that a large curvature portion 24g having a large curvature and a small curvature portion or substantially straight portion 24h having a small curvature are continuous. At least part of the outer shape of an aperture blade 24 is also opposite the cam groove 24d, is substantially parallel to the cam groove 24d, or has a shape offset from the shape of the cam groove 24d, and is constituted by a large curvature portion 24i having a large curvature and a small curvature portion or a substantially straight portion 24j having a small curvature.

The outer shape portion of the base plate 21 corresponding to the convex portions 21c is formed substantially parallel to the large curvature portion 24i formed on at least a part of the outer shape of the aperture blade 24. That is, the large curvature portion 24i formed in the outer shape of an aperture blade 24 is formed substantially parallel to the large curvature portion 24g of the cam groove 24d. Therefore, as a result, the outer shape of the base plate 21 corresponding to the convex portions 21c is formed in a shape substantially parallel to or offset from the large curvature portion 24g of the cam groove 24d.

The cover 25 that is opposite the convex portions 21c also has a convex portion (second convex portion) 25e whose outer shape in the radial direction centered on the optical axis X is approximately the same shape as the convex portions 21c of the base plate 21. The overall shape of the aperture unit 20 is such that a portion protrudes outward in the radial direction from the outer peripheral part of a substantially circular shape centered on the optical axis X.

The concave portion (first concave portion) 21d is formed such that a portion is recessed inward in the radial direction from the outer peripheral portion of a substantially circular outer shape centered on the optical axis X of the main body portion 21a. In other words, the outer shape of the main body portion of the base plate 21 is formed by a portion with a large outside diameter centered on the optical axis X (that is, a substantially circular outer shape centered on the optical axis) and a portion with a small outside diameter (that is, the concave portion 21d). More precisely, when the drive ring 22 is rotationally driven by the drive motor 28 to rotate the aperture blades 24 so that the opening 24b is at its smallest size (see FIG. 9B), the concave portion 21d is formed along the outer shape on the outside in the radial direction of a circle centered on the optical axis X of the aperture blades 24.

As will be discussed below, when the opening 24b is at its smallest size, the amount by which the cam grooves 24d protrude to the outside in the radial direction of a circle centered on the optical axis X reaches its maximum, and the amount of protrusion outward in the radial direction of the outer shape of the aperture blades 24, which are approximately parallel to the cam grooves 24d, also reaches its maximum. The shape of the concave portion 21d is formed to match the outer shape of the aperture blades 24 in this state, that is, along the outer shape, and the concave portion 21d is recessed from the outer shape of the main body portion 21a of the base plate 21, which is approximately circular and centered on the optical axis X.

In a state in which the size of the opening 24b is at its minimum (see FIG. 9B), the cam grooves 24d for rotationally driving the aperture blades 24 are disposed on the outermost side in the radial direction of a circle centered on the optical axis X of the aperture blades 24. Also, the outermost outer shape of the aperture blades 24 in the radial direction is substantially parallel to the cam grooves 24d. Also, in a state in which the drive ring 22 is rotationally driven by the drive motor 28 to rotate the aperture blades 24 so that the opening 24b is at its smallest size, the concave portion 21d is substantially parallel to the cam grooves 24d of the aperture blades 24 and is substantially parallel to the outermost shape of the aperture blades 24 in the radial direction.

The outer shape portion of the base plate 21 corresponding to the concave portion 21d is formed substantially parallel to a small curvature portion or substantially straight portion 24j formed in at least a part of the outer shape of each of the aperture blades 24. That is, the small curvature portion or substantially straight portion 24j formed in the outer shape of an aperture blade 24 is formed substantially parallel to the small curvature portion or substantially straight portion 24h of the cam groove 24d. Therefore, as a result, the outer shape portion of the base plate 21 corresponding to the concave portion 21d is formed in a shape substantially parallel to or offset from the small curvature portion or substantially straight portion 24h of the cam groove 24d.

The cover 25 opposite the concave portion 21d also has a concave portion (second concave portion) 25f whose outer shape in the radial direction centered on the optical axis X is approximately the same as that of as the concave portion 21d of the base plate 21. The overall shape of the aperture unit 20 is such that a portion protrudes inward in the radial direction from the outer peripheral part of a substantially circular shape centered on the optical axis X.

The rotation shafts 21e are provided as the rotation shafts of the aperture blades 24, and as shown in FIG. 4A, nine of the rotation shafts 21e are provided on the outer peripheral side of the main body portion 21a with respect to the optical axis X and on the outer peripheral side of the cam pins 22d of the drive ring 22 with respect to the optical axis X, and at approximately equal intervals in the circumferential direction around the optical axis X. As shown in FIG. 4B, the rotation shafts 21e are providing facing toward the cover 25 along the optical axis direction from the image plane-side surface of the substantially annular main body portion 21a. The rotation shafts 21e are inserted into the through-holes 24c (FIG. 6A) of the nine aperture blades 24, and function as the rotational centers of the aperture blades 24.

The stopper 21f is provided as a mechanical end at the aperture open end (the end on the open aperture side), and restricts the rotational range of the drive ring 22 when the convex portion of the drive ring 22 where the gear portion 22c is provided comes into contact with the surface of the stopper 21f.

As shown in FIG. 4A, three latching portions 21g are provided at approximately equal intervals in the circumferential direction around the optical axis X so as to protrude radially outward from the approximately annular inner circumferential surface. The latching portions 21g restrict the movement of the drive ring 22 in the optical axis X direction by bayonet coupling (discussed below) when the drive ring 22 is fitted into the annular recess 21h of the base plate 21.

The annular recess 21h is a space into which the drive ring 22 is fitted, and is provided as a substantially annular recess on the image plane-side surface of the main body portion 21a. The width of the recessed part of the annular recess 21h is slightly greater than the width of the main body portion 22a of the drive ring 22. The latching portions 21g are provided so as to protrude radially outward, at a position that is slightly higher than the thickness of the drive ring 22 from the bottom surface of the annular recess 21h.

(2-2) Drive Ring 22

As shown in FIG. 5A, the drive ring 22 has a substantially annular main body portion 22a, an opening 22b formed in the center, a gear portion 22c, nine cam pins 22d, a light shielding blade 22e, latching grooves 22f, and latched portions 22g. The drive ring 22 is rotationally driven around the optical axis X by the drive motor 28, thereby rotating the aperture blades 24 and adjusting the opening surface area of the aperture unit 20.

As shown in FIG. 5A, the main body portion 22a is a substantially annular plate-like member, and an opening 22b is formed in the center thereof.

The opening 22*b* is an open portion through which light from the aperture unit 20 passes, and has a diameter or surface area that is approximately equal to or slightly larger than the opening 24*b* formed when the aperture blades 24 are fully open. The opening 22*b* has a diameter or surface area approximately equal to or larger than the opening 23*b* of the aperture sheet 23.

As shown in FIG. 5A, the gear portion 22*c* is provided at a portion that protrudes outward in the radial direction from a part of the outer periphery of the substantially annular main body portion 22*a*, and is formed so as to mesh with the reduction gear 28*a* attached to the rotation shaft of the drive motor 28 (see FIG. 3, etc.). The gear portion 22*c* rotationally drives the drive ring 22 around the optical axis X when the rotational drive force of the drive motor 28 is transmitted through the reduction gear 28*a*.

Also, the lateral surface of the protrusion where the gear portion 22*c* is provided comes into contact with the stopper 21*f* on the base plate 21 side (discussed above), which restricts the end (the mechanical end on the aperture opening side) in the rotational direction of the drive ring 22 with respect to the base plate 21.

Figure 14B:
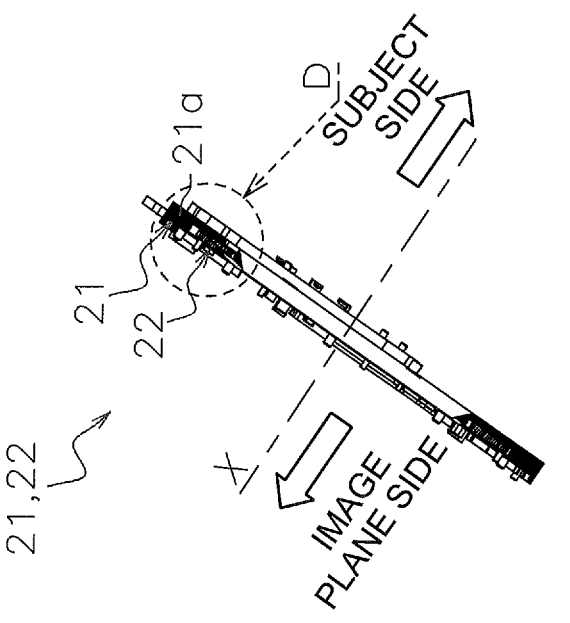
FIG. 14B is a cross-sectional view along the C-C line in FIG. 14A.
Figure 14B:
Figure 14A:
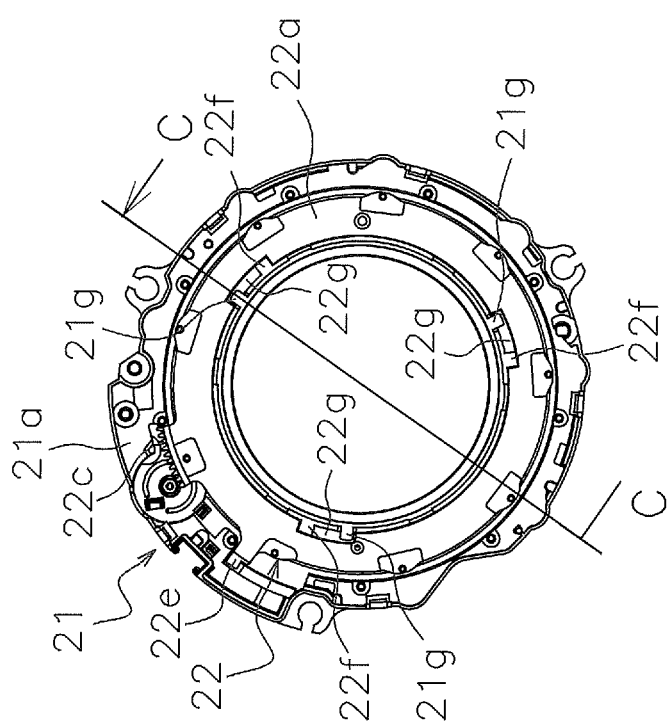
FIG. 14A is a plan view showing the phase of a state in which the base plate in FIG. 4A and the drive ring in FIG. 5A have been assembled.

As shown in FIGS. 5A, 5B, and 14A, the cam pins 22*d* are disposed more to the outer peripheral side of the optical axis X than the rotation shafts 21*e* on the main body portion 22*a*, and are nine cylindrical portions that protrude toward the cover 25 along the optical axis X from the surface of the main body portion 22*a* on the image plane side, and are inserted into cam grooves 24*d* provided to the nine aperture blades 24 (discussed below).

In FIG. 5A, only four cam pins 22*d* are visible because of the angle of the drawing, but in reality, nine cam pins 22*d* are provided at approximately equal angular intervals.

Consequently, when the drive ring 22 is rotationally driven around the optical axis X, the cam pins 22*d* move in the circumferential direction around the optical axis X due to the rotation of the drive ring 22, and the aperture blades 24 having the cam grooves 24*d* in which the cam pins 22*d* are engaged are rotated around the rotation shafts 21*e* by a conventional cam mechanism.

When the drive ring 22 is rotationally driven, the cam pins 22*d* rotate around the optical axis X, and the opening 24*b* transitions between a fully open state (open aperture state) and a fully closed state (minimum aperture state) as an opening and closing operation. As the opening 24*b* transitions from its fully closed state (minimum aperture state) to its fully open state (open aperture state), the cam pins 22*d* and the aperture blades 24 adjacent to the aperture blades 24 having the cam grooves 24*d* in which the cam pins 22*d* are engaged gradually move closer together.

More specifically, the cam pins 22*d* and the width d4 portions (narrow width portions; discussed below) of the aperture blades 24 adjacent to the aperture blades 24 with which the cam pins 22*d* are engaged move closer together. The outer shape portions of the cam pins 22*d* and the width d4 portions (narrow width portions; discussed below) of the aperture blades 24 adjacent to the cam pins 22*d* are closest together when the opening 24*b* is fully open (open aperture state), but in this state are disposed with a specific gap between them, that is, at a distance apart, they do not interfere with each other.

Consequently, by rotating the nine aperture blades 24 by rotating the drive ring 22, the opening 24*b* can be opened and closed and the size of the aperture opening of the aperture unit 20 can be adjusted.

As shown in FIGS. 5A and 5B, the light shielding blade 22*e* is formed by a protrusion (second protrusion) 22*h* that protrudes outward in the radial direction from a part of the outer periphery of the main body portion 22*a*, and is formed so as to be convex in the optical axis X direction from the protrusion 22*h*. When the drive ring 22 is rotationally driven with respect to the optical axis X to a specific location during the opening and closing operation of the aperture blades 24, the light shielding blade 22*e* is inserted between the light emitting part and the light receiving part of the photointerrupter 29*a*, which blocks the light emitted from the light emitting part toward the light receiving part. Consequently, information about the rotational position of the drive ring 22 is sensed by the photointerrupter 29*a*.

The latching grooves 22*f* are grooves into which the latching portions 21*g* on the base plate 21 side are inserted from the optical axis X direction when the drive ring 22 is fitted into the annular recess 21*h* of the base plate 21, and three of them are provided at approximately equal intervals on the inner circumferential side of the main body portion 22*a*.

As shown in FIGS. 5A and 14A, the latched portions 22*g* are provided at positions adjacent to the latching grooves 22*f* on the image plane-side surface of the main body portion 22*a*, and are stepped portions formed with a thinner wall thickness than the other parts of the main body portion 22*a*.

In FIG. 5A, due to the angle of the drawing, it appears that a latched portion 22*g* is provided at only a position adjacent to one of the latching grooves 22*f*, but in reality, as shown in FIG. 14A, latched portions 22*g* are provided at positions adjacent to each of the three latching grooves 22*f*.

When the drive ring 22 is fitted into the annular recess 21*h* of the base plate 21, in a state in which the upper surface in FIG. 5A 21*g* is facing toward the annular recess 21*h* of the base plate 21, three latching grooves 22*f* on the drive ring 22 side are aligned with three locking grooves 22*f* on the drive ring 22 side. Then, still in this state, when the drive ring 22 is moved closer to the base plate 21 in the optical axis X direction, the drive ring 22 is fitted into the annular recess 21*h* on the base plate 21 side.

From here, as shown in FIG. 14A, when the drive ring 22 is rotated clockwise, the latching portions 21*g* on the base plate 21 side ride up and over the latched portions 22*g* on the drive ring 22 side, which restricts the movement of the drive ring 22 in the optical axis X direction with respect to the base plate 21 (bayonet coupling).

(2-3) Aperture Blades 24

As shown in FIG. 3, the aperture blades (movable blades) 24 are disposed between the aperture sheet 23 and the cover 25 in the light incidence direction. The aperture blades 24 rotate around the rotation shafts 21*e* (see FIG. 4A) provided on the base plate 21 as the drive ring 22 rotates, thereby varying the size (surface area) of the opening 24*b* (see FIG. 3, etc.) to adjust the amount of light passing through the open portion of the aperture unit 20.

Figure 6A:
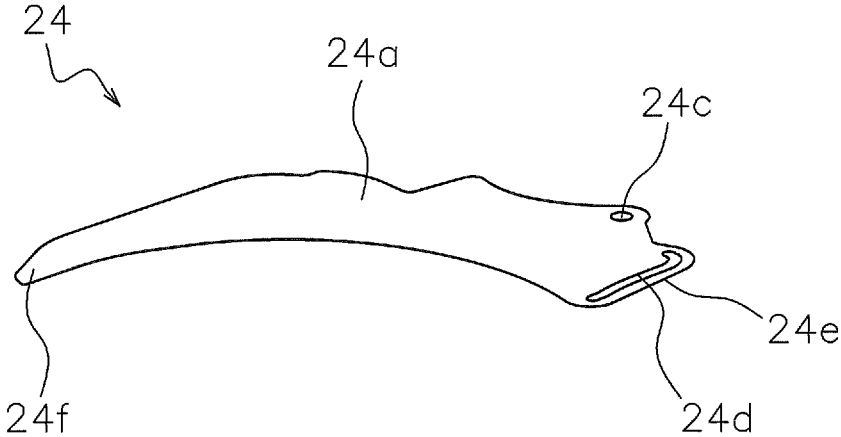
FIG. 6A is an oblique view of the configuration of movable blades included in the aperture unit of FIG. 2.
Figure 6B:
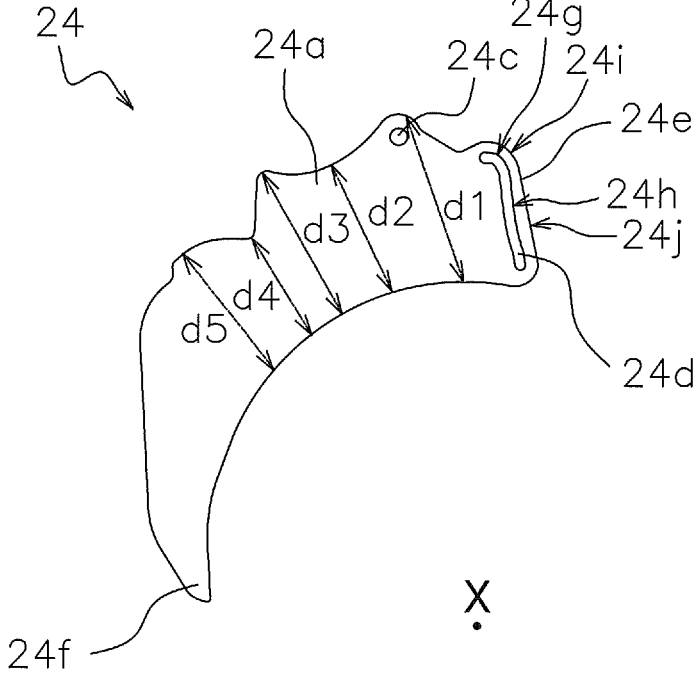
FIG. 6B is a plan view of the movable blades in FIG. 6A.

More precisely, as shown in FIGS. 6A and 6B, an aperture blade 24 has a main body portion 24*a*, a through-hole 24*c*, a cam groove 24*d*, a first end 24*e*, and a second end 24*f*.

The main body portion 24*a* is a flat member formed in a blade shape, as shown in FIGS. 6A and 6B.

A rotation shaft 21*e* (see FIG. 4A, etc.) provided on the base plate 21 is inserted into the through-hole 24*c*. Consequently, the aperture blade 24 rotates around the rotation shaft 21*e* inserted into the through-hole 24*c*.

The cam groove 24*d* is formed near the first end 24*e*, which is the end on the side of the through-hole 24*c* into which the rotation shaft 21*e* is inserted, that is, on the opposite side from the second end 24*f* with respect to the rotation shaft 21*e* or the rotation center, and passes through the main body portion 24a. The cam groove 24d is formed so that when the drive ring 22 is rotationally driven in a state in which the cam pin 22d (see FIG. 5A, etc.) provided to the drive ring 22 has been inserted, the cam pin 22d moves in the circumferential direction around the optical axis X, and as a result the aperture blade 24 with which the cam groove 24d is engaged is rotated around the rotation shaft 21e by a conventional cam mechanism, thereby opening or closing the aperture opening. As discussed above, the cam groove 24d is formed on the opposite side from the second end 24f with respect to the rotation shaft 21e or the rotation center. The second end 24f of the aperture blade 24 is a free end on the outer shape side that forms the inside diameter of the opening 24b when the opening 24b is in its fully closed state (minimum aperture state). Accordingly, as the opening 24b transitions from a fully open state (open aperture state) to a fully closed state (minimum aperture state) as an opening and closing operation, the second end 24f moves closer to the optical axis X. As this happens, the second end 24f and the cam groove 24d formed on the opposite side from the rotation shaft 21e or the rotation center moves away from the optical axis X. That is, the cam groove 24d near the first end 24e side, which is on the opposite side from the second end 24f and the rotation shaft 21e or the rotation center, begins to protrude outward in the radial direction (outside diameter side) of a circle centered on the optical axis.

Thus, when the opening 24b is in its fully closed state (minimum aperture state), the amount of protrusion of the cam groove 24d outward in the radial direction (outside diameter side) of a circle centered on the optical axis X reaches its maximum, and the amount of protrusion outward in the radial direction (outside diameter side) of the outer shape of the aperture blade 24, which is substantially parallel to the cam groove 24d, also reaches its maximum.

The shapes of the convex portions 21c and the concave portion 21d of the base plate 21 are formed to match (that is, conform to) the outer shape of the aperture blade 24 when this amount of protrusion is at its maximum. The convex portions 21c are formed to protrude from the outer shape portion of the main body portion 21a of the base plate 21, which is approximately circular and with the optical axis X as the center, and the concave portion 21d is formed to be recessed.

In a state in which the movable blades protrude outward in the radial direction of a circle centered on the optical axis due to the opening or closing operation of the aperture blades 24, the external shape portions of the convex portions 21c and the concave portion 21d include a shape that is substantially parallel to the cam groove 24d, or a shape that is offset.

The first end 24e is the end on the side of the through-hole 24c into which the rotation shaft 21e is inserted, and basically, whether the aperture opening is fully open (open aperture state) or fully closed (minimum aperture state), the first end 24e is disposed in the gap between the base plate 21 and the cover 25. Also, a cam groove 24d is provided at the first end 24e, substantially running along the outer shape of the first end 24e side. The width of the main body portion 24a between the cam groove 24d and the first end 24e, that is, the length of the aperture blade 24 in a direction perpendicular to the thickness direction, is preferably as small as possible without greatly deforming or damaging when the aperture blades 24 are rotationally driven, and more specifically, is about 0.5 to 2 times the width of the cam groove 24d.

The second end 24f is a free end provided on the opposite side from the first end 24e in the main body portion 24a, and when the aperture blade 24 rotates around the rotation shaft 21e, the second end 24f moves out to the open portion of the aperture unit 20 so as to cover this open portion, or retracts from the open portion. In other words, the second end 24f is a free end on the outer shape side that forms the inside diameter of the opening 24b when the opening 24b is in its fully closed state (minimum aperture state).

Also, as shown in FIG. 6B, the width dimensions of the aperture blade 24 are set such that the width d2 is less than the width d1 near the through-hole 24c, from the first end 24e on the side of the through-hole 24c into which the rotation shaft 21e is inserted, toward the second end 24f, which is a free end, the width d3 becomes larger, the width d4 becomes smaller again, and the width d5 becomes larger again.

As shown in FIG. 6B, the width of the aperture blades 24 refers to the width in the approximate radial direction of a circle centered on the optical axis direction, or to a direction substantially parallel to the radial direction, when the aperture blades 24 are in their fully open position (open aperture state). In other words, the width is the length (that is, the distance) between the outer shape on the optical axis side (open aperture side, inside diameter side) when the aperture blades 24 are in their fully open position (open aperture state), and the outer shape on the opposite side (outside diameter side) of the optical axis X. In the aperture blades 24, the outer shape on the optical axis X side (open aperture side, inside diameter side) is a continuous and approximately circular shape as viewed from the optical axis direction, so the width as referred to here depends on the shape of the outer shape portion on the opposite side from the optical axis X (the outside diameter side).

The width d2, which is less than the width d1 near the through-hole 24c, is set small in order to avoid interference with the shape or components on the base plate 21 side.

The width d3 (large width portion), which is greater than the width d2, is set large in order to maintain an overlapping state with the adjacent aperture blades 24. Because of this width d3 (large width portion), in any state in which the aperture opening transitions between its maximum and the minimum (open aperture state and minimum aperture state; see FIGS. 8C and 9B), adjacent aperture blades 24 are maintained in a state of overlapping in the optical axis X direction, that is, a state in which the aperture blades 24 are always overlapping so long as they are being driven to open or close. At the least, the width d3 (large width portion) overlaps with the adjacent aperture blade 24 in a state in which the aperture opening is at its smallest (minimum aperture state), when overlap with the adjacent aperture blades 24 is the most disadvantageous. In other words, in a state in which the aperture opening is at its smallest (minimum aperture state), a state in which adjacent aperture blades 24 overlap each other is one in which the outer shape portion on the opposite side (outside diameter side) from the optical axis X of the width d3 portion when the aperture blades 24 are in their fully open position (open aperture state), overlaps the outer shape portion on the optical axis X side (open aperture side, inside diameter side) when the aperture blades 24 are in their fully open position (open aperture state).

Therefore, the order in which the aperture blades 24 overlap is not disturbed, collisions between the aperture blades 24 during rotation are avoided, and the aperture blades 24 can be rotated smoothly.

As discussed above, in at least the state in which the aperture opening is at its maximum (fully open state; see FIGS. 7A and 9A), the width d4 (narrow width portion) that is less than the width d3 (large width portion) is set small in order to avoid interference between components since shafts or pins (cam pins 22d) having a length in the optical axis direction and constituting the cam mechanism for rotationally driving the adjacent aperture blades 24 move relatively closer together from the outside in the approximate radial direction of a circle centered on the optical axis X, or from the outside in a direction substantially parallel to the radial direction. In other words, when the aperture opening is at its maximum, the width d4 portion (narrow width portion) is disposed closer to the inside than the cam pins 22d that rotationally drive the adjacent movable blades in the approximate radial direction centered on the optical axis or in a direction substantially parallel to the radial direction.

Therefore, in at least a state in which the aperture opening is at its minimum (minimum aperture state; see FIGS. 8C and 9B), the width d4 (narrow width portion) cannot maintain an overlapping state with the adjacent aperture blades 24 in the optical axis X direction, that is, there is no overlapping in this state. In other words, when the aperture opening is at its minimum (minimum aperture state), the overlapping state of the adjacent aperture blades 24 is one in which the outer shape portion on the opposite side (outside diameter side) from the optical axis X of the width d4 portion when the aperture blades 24 are in their fully open position (open aperture state), does not overlap the outer shape portion on the optical axis X side (open aperture side, inside diameter side) when the aperture blades 24 are in their fully open position (open aperture state).

The width d5 (large width portion), which is greater than the width d4 (narrow width portion) and approximately the same as the width d3 (large width portion), is set large so that adjacent aperture blades 24 will overlap each other and this overlapping state will be maintained. Consequently, in any state in which the aperture opening transitions between its maximum and the minimum (open aperture state and minimum aperture state; see FIGS. 7A to 7D, FIGS. 8A to 8C, and FIGS. 9A to 9B), the overlapping state of adjacent the aperture blades 24 in the optical axis X direction is maintained. At the least, the width d5 (large width portion) overlaps with the adjacent aperture blade 24 in a state in which the aperture opening is at its smallest (minimum aperture state), when overlap with the adjacent aperture blades 24 is the most disadvantageous. In other words, in a state in which the aperture opening is at its smallest (minimum aperture state), a state in which adjacent aperture blades 24 overlap each other is one in which the outer shape portion on the opposite side (outside diameter side) from the optical axis X of the width d5 portion when the aperture blades 24 are in their fully open position (open aperture state), overlaps the outer shape portion on the optical axis X side (open aperture side, inside diameter side) when the aperture blades 24 are in their fully open position (open aperture state).

The width d3 (large width portion), the width d4 (narrow width portion), and the width d5 (large width portion) are disposed close to each other in the direction going from the first end 24e to the second end 24f. Furthermore, the width d3 (large width portion), the width d4 (narrow width portion), and the width d5 (large width portion) are smoothly linked in a continuous curve or straight line to form the outer shape of the aperture blade 24 (see FIG. 6B). In other words, when viewed in the optical axis X direction, the shape of the outer shape portion on the opposite side from the optical axis X when the aperture blades 24 are in their fully open position (open aperture state) is such that the width d4 portion has a relatively concave shape with respect to the width d3 portion and the width d5 portion, and conversely, the width d3 portion and the width d5 portion have a relatively convex shape with respect to the width d4 portion. Therefore, in the process of changing the opening diameter by rotation of the aperture blades 24, even in a state in which the width d4 portion (narrow width portion) cannot maintain the overlap in the optical axis X direction with the adjacent aperture blades 24, the width d3 portion (large width portion) and the width d5 (large width portion), which are disposed on either side of the width d4 portion (narrow width portion), always maintains overlap with the adjacent aperture blades 24 (see FIGS. 8C and 9B). At the least, in a state in which the aperture opening is at its smallest (minimum aperture state), when overlap with the adjacent aperture blades 24 is most disadvantageous, the width d3 portion (large width portion) and the width d5 (large width portion), which are disposed on either side of the width d4 portion (narrow width portion), will overlap the adjacent aperture blades 24 even though the width d4 (narrow width portion) does not overlap the adjacent aperture blades 24 in the optical axis X direction. In other words, in a state in which the aperture opening is at its smallest (minimum aperture state), in the outer shape portion on the opposite side (outside diameter side) from the optical axis X when the aperture blades 24 are in their fully open position (open aperture state), the width d4 portion is relatively concave and the width d3 portion and the width d5 portion are relatively concave, so the width d4 portion does not overlap the outer shape portion on the optical axis X side (opening diameter side, inside diameter side) of the adjacent aperture blades 24, but does overlap the width d3 portion and the width d5 portion. Accordingly, the order in which the aperture blades 24 overlap is not disturbed, collisions between the aperture blades 24 during rotation are avoided, and the aperture blades 24 can be rotated smoothly.

As discussed above, when viewed in the optical axis X direction, the shape of the outer shape portion on the opposite side (outside diameter side) from the optical axis X when the aperture blades 24 are in their fully open position (open aperture state) is such that the width d4 portion has a relatively concave shape with respect to the width d3 portion and the width d5 portion. Therefore, in the state of FIG. 9B, that is, a state in which the aperture opening is at its smallest (minimum aperture state), there will be portions that are not covered by the substantially triangular aperture blade 24, that is, portions where there is no aperture blade 24, in between the width d3 portion (large width portion), the width d4 portion (narrow width portion), and the width d5 portion (large width portion) and the adjacent aperture blade 24, but since the main body portion 21a of the base plate 21 (first frame body) overlaps the portions not covered by the substantially triangular aperture blade 24, no harmful light, such as light leakage, occurs in these portions.

As a result, it is possible to provide an aperture unit 20 in which the aperture blades 24 can rotate smoothly, without any interference between the aperture blades 24 and the cam pins 22d, and without having to increase the size.

Furthermore, the length of the second end 24f on the opposite side from the first end 24e on the side of the through-hole 24c into which the rotation shaft 21e is inserted is set such that there will be no overlap with the first end 24e of two adjacent aperture blades 24 in a state in which the aperture opening is at its largest (fully open state; see FIG. 9A).

The mechanism for opening and closing the nine aperture blades 24 in the aperture unit 20 of this embodiment will now be described.

As discussed above, in the aperture unit 20 of this embodiment, the surface area of the opening 24*b* formed in the center portion of the nine aperture blades 24, that is, in the center of the optical axis X, can be varied by rotating the nine aperture blades 24 around their respective rotation shafts 21*e*.

Figures 7A, 7B, 7C, 7D:
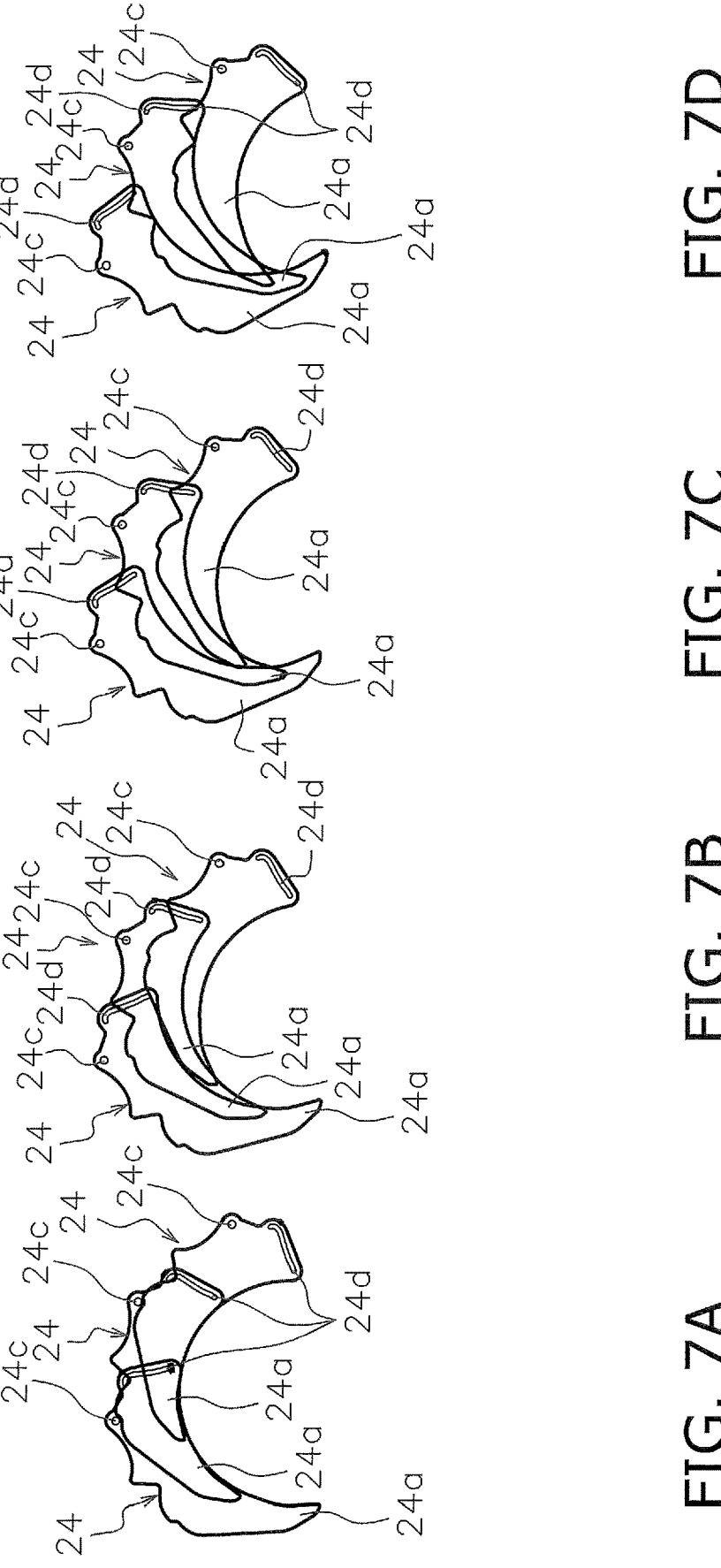
FIG. 7A is a plan view showing the movement of the movable blades when the size of the opening of the aperture unit in FIG. 2 changes from maximum to minimum.
FIG. 7B is a plan view showing the movement of the movable blades when the size of the opening of the aperture unit in FIG. 2 changes from maximum to minimum.
FIG. 7C is a plan view showing the movement of the movable blades when the size of the opening of the aperture unit in FIG. 2 changes from maximum to minimum.
FIG. 7D is a plan view showing the movement of the movable blades when the size of the opening of the aperture unit in FIG. 2 changes from maximum to minimum.

More specifically, when the drive ring 22 is rotated in a state in which the cam pins 22*d* of the drive ring 22 have been inserted into the cam grooves 24*d* of the nine aperture blades 24, as shown in FIG. 7A, the rotation is counterclockwise around the through-holes 24*c* into which the rotation shafts 21*e* are inserted, from a state in which adjacent aperture blades 24 overlap each other.

Figure 8C:
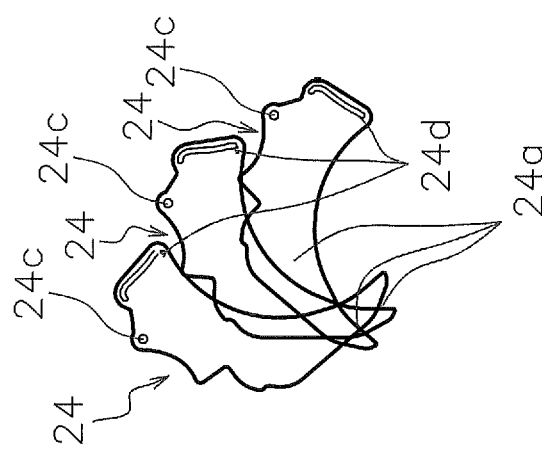
FIG. 8C is a plan view showing the movement of the movable blades when the size of the opening of the aperture unit in FIG. 2 changes from maximum to minimum.
Figure 8B:
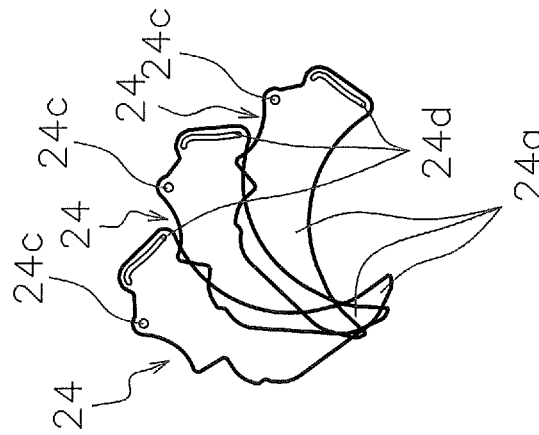
FIG. 8B is a plan view showing the movement of the movable blades when the size of the opening of the aperture unit in FIG. 2 changes from maximum to minimum.
Figure 8A:
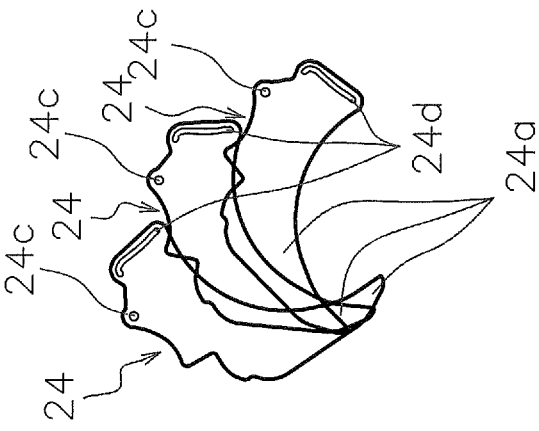
FIG. 8A is a plan view showing the movement of the movable blades when the size of the opening of the aperture unit in FIG. 2 changes from maximum to minimum.

Then, as shown in FIGS. 7B to 7D, the free end (second end 24*f*) of each aperture blade 24 on the outer shape portion side forming the minimum aperture opening diameter gradually moves out toward the optical axis X. At this point, when the drive ring 22 is further rotationally driven, the aperture blades 24 further rotate counterclockwise, reducing the surface area of the aperture opening (opening 24*b*), as shown in FIGS. 8A to 8C.

Consequently, the surface area of the aperture opening can be adjusted between the state where the aperture opening is at its largest (fully open state) shown in FIG. 9A and the state where the aperture opening is at its smallest (closed state) shown in FIG. 9B.

Here, as discussed above, the outer shape of the base plate 21 is such that when the aperture opening shown in FIG. 9B is at its smallest, the convex portions 21*c* that protrude in the radial direction from an outer shape portion that is substantially circular and centered on the optical axis A are formed to match the outer shape of the aperture blades 24.

Consequently, by forming the outer shape of the aperture unit 20 to be convex only at the portions where the aperture blades 24 protrude to match the movement of the aperture blades 24, any unnecessary portions of the outer shape can be trimmed away, so the outside diameter can be made smaller than that of a conventional aperture unit.

Similarly, with the concave portion 21*d*, the outer shape of the aperture unit 20 is formed to be concave only over the range where the aperture blades 24 do not move, to match the movement of the aperture blades 24, thereby allowing any unnecessary portions of the outer shape to be trimmed away, so the outside diameter can be made smaller than that of a conventional aperture unit.

(2-4) Cover 25

As shown in FIG. 3, the cover (second frame body) 25 is a substantially annular member disposed the furthest downstream in the light incidence direction and on the image plane side of the plurality of aperture blades 24. As shown in FIG. 10, the cover 25 has a substantially annular main body portion 25*a*, an opening (second opening) 25*b*, concave portions 25*c*, three protrusions (first, second, and third protrusions, support portions) 25*da*, 25*db*, and 25*dc*, a convex portion (second convex portion) 25*e*, a concave portion (second concave portion) 25*f*, a stopper (rotation restrictor) 25*g*, and a reference surface 25*h*.

As shown in FIG. 10, the main body portion 25*a* is a substantially annular, flat member, and the opening 25*b* is formed in the center thereof.

The opening 25*b* is the open portion through which light from the aperture unit 20 passes, and has a diameter or surface area that is equal to or slightly larger than that of the opening 24*b* formed when the plurality of aperture blades 24 are fully open.

The reference surface 25*h* is a surface that is substantially perpendicular to the optical axis and is constituted by the surface on the aperture blade 24 side of the main body portion 25*a* in the optical axis X direction, and is opposite the aperture blades 24.

The concave portions 25*c* have a shape that is recessed from the reference surface 25*h* toward the opposite side from the aperture blades 24 in the optical axis X direction, and are bottomed (not penetrating) grooves inside of which move the inserted distal end portions of the cam pins 22*d* on the drive ring 22 side, and nine of these are provided (that is, in the same number as the cam pins 22*d*) at positions overlapping the cam grooves 24*d* of the aperture blades 24 described above when viewed in the optical axis X direction.

The three protrusions (first, second, and third protrusions, supporting portions) 25*da*, 25*db*, and 25*dc* are provided so as to protrude from the reference surface 25*h* toward the aperture blade 24 side in the optical axis X direction, and support the surface on the image plane side of the aperture blades 24, that is, on the cover 25 side. The three protrusions 25*da*, 25*db*, and 25*dc* are respectively disposed along the radial direction of a circle centered on the optical axis X, as shown in FIG. 10.

As shown in FIG. 10, nine protrusions 25*da*, that is, the same number as the number of aperture blades 24 and the number of cam pins 22*d*, are provided in an arc shape along the circumferential direction centered on the optical axis X at positions adjacent to and outside in the radial direction of the concave portions 25*c*. The protrusions 25*da* support the surface on the image plane side and further to the outside diameter side of the engaging portion of the cam grooves 24*d* with the cam pins 22*d* on the first end 24*e* side of the aperture blades 24 (see FIG. 13).

As shown in FIG. 10, the protrusion 25*db* is disposed adjacent to the concave portions 25*c* and further to the inside diameter side than the protrusions 25*da* and the concave portions 25*c*, and is an annular convex portion centered on the optical axis X, disposed on the opposite side from the protrusions 25*da* with the concave portions 25*c* in between in the radial direction of a circle centered on the optical axis X. The protrusion 25*db* protrudes in substantially the same way as the protrusions 25*da* in the optical axis X direction from the reference surface 25*h*, and its height (amount of protrusion) from the reference surface 25*h* is approximately the same as that of the protrusions 25*da*. The protrusion 25*db* supports the surface of the aperture blades 24 on the image plane side on the inside diameter side of the engaging portion of the cam grooves 24*d* of the aperture blades 24 with the cam pins 22*d*, constituting the cam mechanism (see FIG. 13).

As shown in FIG. 10, the protrusion 25*dc* is an annular convex part provided on the innermost peripheral side of the substantially annular main body portion 25*a*, further to the inner radial side of the protrusions 25*da* and the protrusion 25*db* in the radial direction of a circle centered on the optical axis X. The protrusion 25*dc* protrudes in substantially the same way as the protrusions 25*da* and the protrusion 25*db* in the optical axis X direction from the reference surface 25*h*, and its height (amount of protrusion) from the reference surface 25*h* is approximately the same as that of the protrusions 25*da* and the protrusion 25*db*. The protrusion 25*dc* supports the surface on the image plane side of the aperture blade 24 near the innermost diameter portion on the innermost peripheral side of the cover 25 (see FIG. 13).

The structure for supporting one aperture blade 24 with the three protrusions 25*da*, 25*db*, and 25*dc* and for preventing the aperture blade 24 from coming loose will be described in detail below.

Just as with the convex portions 21c of the base plate 21 described above, the convex portions (second convex portions) 25e are formed so that a portion protrudes toward the outside in the radial direction from the outer peripheral part of the approximately circular outer shape of the main body portion 25a. More precisely, the convex portions 25e are formed along the outer shape on the outside in the radial direction centered on the optical axis X of the aperture blades 24 in a state in which the drive ring 22 has been rotationally driven by the drive motor 28 and the aperture blades 24 have been rotated so that the opening 24b is at its smallest size (see FIG. 9B).

Just as with the concave portion 21d of the base plate 21 described above, the concave portion (second concave portion) 25f is formed such that a portion is recessed inward in the radial direction from the outer peripheral part of the substantially circular outer shape of the main body portion 25a. More precisely, the concave portion 25f is formed along the outer shape on the outside in the radial direction centered on the optical axis X of the aperture blades 24 in a state in which the drive ring 22 has been rotationally driven by the drive motor 28 and the aperture blades 24 have been rotated so that the opening 24b is at its smallest size (see FIG. 9B).

Also, the concave portion 25f is substantially parallel to the cam grooves 24d of the aperture blades 24 in a state in which the drive ring 22 has been rotationally driven by the drive motor 28 and the aperture blades 24 have been rotated so that the opening 24b is at its smallest size.

Here, as described above, the outer shape of the cover 25 has convex portions 25e formed to match the outer shape of the aperture blades 24 when the aperture opening is at its smallest as shown in FIG. 9B.

Consequently, by forming only the protruding portions of the aperture blades 24 in a convex shape to match the movement of the aperture blades 24, any unnecessary portions of the outer shape can be trimmed away, so the outside diameter can be made smaller than that of a conventional aperture unit.

Similarly, with the concave portion 25f, the range where the aperture blades 24 do not move is formed to be concave to match the movement of the aperture blades 24, thereby allowing any unnecessary portions of the outer shape to be trimmed away, so the outside diameter can be made smaller than that of a conventional aperture unit.

As shown in FIG. 10, the stopper (rotation restricting portion) 25g has a shape that protrudes in the optical axis from the surface of the main body portion 25a on the subject side, that is, the base plate 21 side, and is provided at the approximate end of the range over which the light shielding blade 22e moves on the drive ring 22 side (see FIGS. 19A and 19B). The stopper (rotation restricting portion) 25g is formed so that the light shielding blade 22e of the drive ring 22 is convex in the optical axis X direction, and has a contact surface that comes into contact with the side surface formed in the radial direction centered on the optical axis X of the protrusion (second protrusion) 22h that protrudes radially outward from the main body portion 22a. This side surface of the protrusion 22h is formed integrally with the light shielding blade 22e and is disposed near the light shielding blade 22e. That is, the stopper 25g is a member that defines the rotation angle range of the drive ring 22 that opens and closes the aperture blades 24 by rotating with respect to the base plate 21, and forms the end of the movement range (minimum aperture-side end) where the opening diameter (surface area) of the opening (third opening) 24b formed by the aperture blades 24 is at its smallest.

Consequently, the stopper 25g is brought into contact with the side surface of the protrusion 22h protruding from the main body portion 22a on which is formed the light shielding blade 22e that detects a reference signal of the rotational position of the drive ring 22, which determines the accuracy of the opening diameter (surface area) of the opening (third opening) 24b formed by the plurality of aperture blades 24 (that is, the side surface near the light shielding blade, the side surface directly under the light shielding blade, or the side surface adjacent to the light shielding blade), thereby constituting one of the mechanical ends at which the aperture opening of the drive ring 22 is at its smallest, and this improves the positional accuracy and control accuracy of the drive ring 22 in the rotational direction.

The structure for supporting one aperture blade 24 and preventing the aperture blade 24 from coming loose by means of the protrusions 25da, 25db, and 25dc provided to the cover 25 will now be described using FIGS. 11 to 13.

Figure 11:
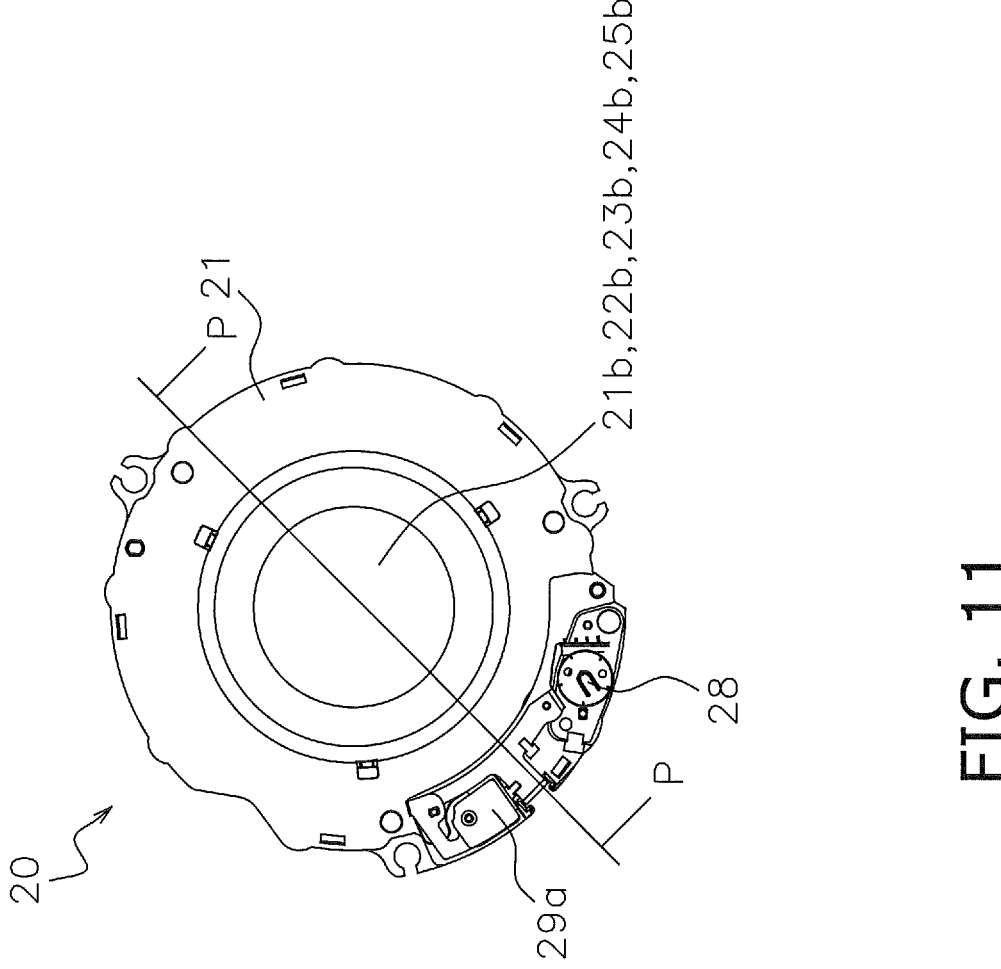
FIG. 11 is a top view of the aperture unit in FIG. 2.
Figure 12B:
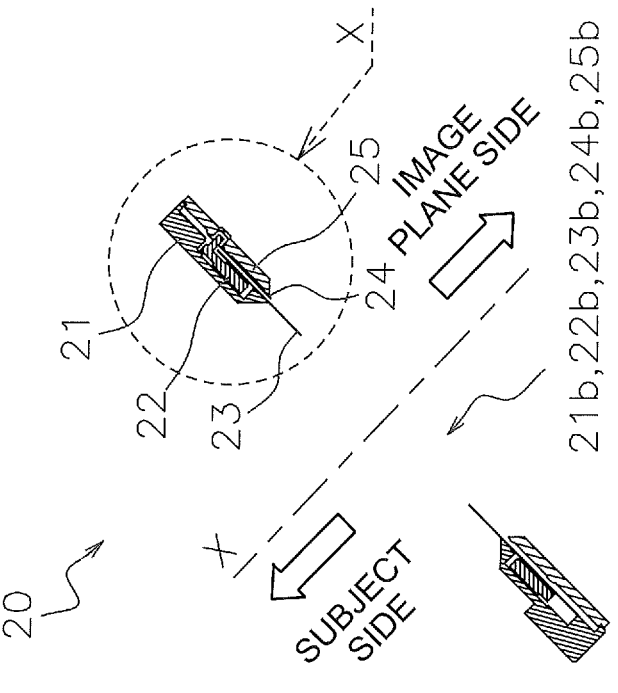
FIG. 12B is a cross-sectional view showing only the main components included in the cross-sectional view of FIG. 12A.
Figure 12A:
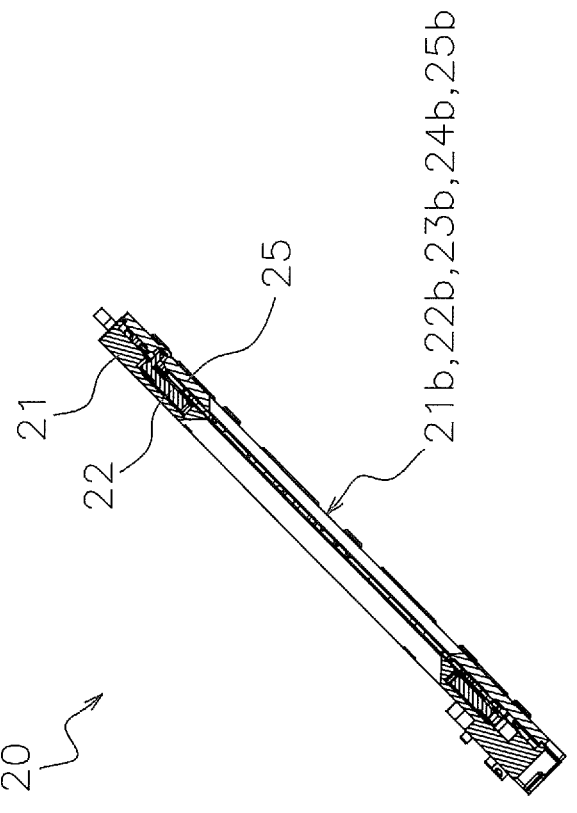
FIG. 12A is a cross-sectional view along the P-P line in FIG. 11A.

FIG. 11 is a top view of the aperture unit 20, and FIG. 12A is a cross-sectional view along the P-P line in FIG. 11. FIG. 12B shows only the main components in the cross-sectional view of FIG. 12A.

Figure 13:
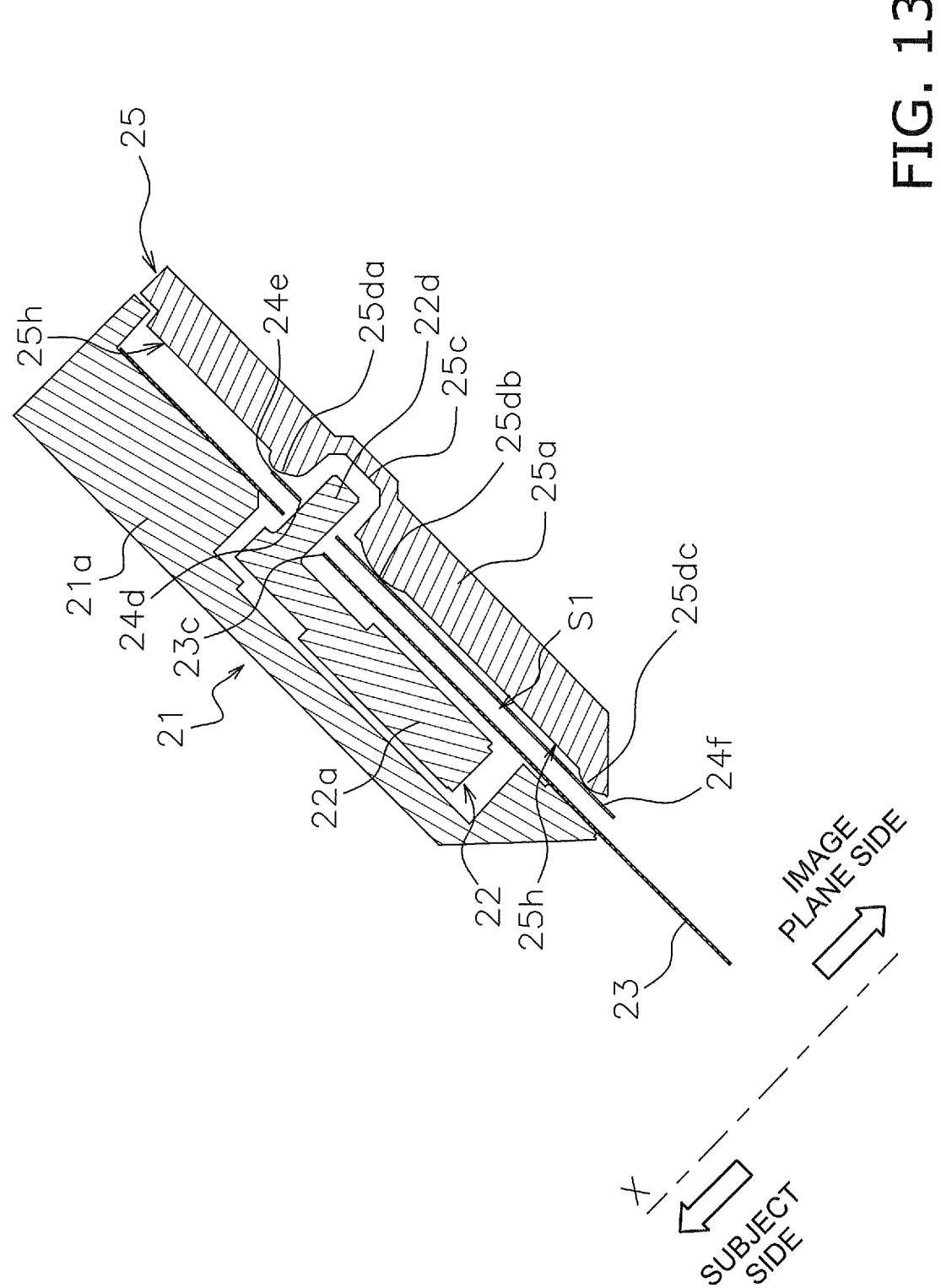
FIG. 13 is a detail view of the X portion in FIG. 12B.

As shown in FIG. 13, which is a detail view of the X portion in FIG. 12B, the drive ring 22, the aperture sheet 23, and the aperture blade 24 are sandwiched between the base plate 21 and the cover 25.

As shown in FIG. 13, the aperture blades 24 are disposed on the image plane side of the aperture sheet 23 in a storage space S1 for the aperture blades 24, and the surface on the image plane side is supported by the three protrusions 25da, 25db, and 25dc provided along the radial direction centered on the optical axis X on the cover 25 side.

The three protrusions 25da, 25db, and 25dc support the surface on the image plane side of the aperture blades 24 at substantially the same height position in the optical axis X direction. That is, the heights of the three protrusions 25da, 25db, and 25dc from the reference surface 25h in the optical axis X direction, that is, the protrusion amounts, are substantially the same.

The three protrusions 25da, 25db, and 25dc are independent in their height from the reference surface 25h and are not linked. In other words, in the radial direction of a circle centered on the optical axis X, the protrusions are not connected at the same height. In the radial direction centered on the optical axis X, the portions between the three protrusions 25da, 25db, and 25dc are linked at approximately the height of the reference surface 25h.

Here, the cam pins 22d of the drive ring 22 are inserted into the cam grooves 24d from the subject side and pass through the aperture blade 24 supported by the protrusions 25da, 25db, and 25dc.

When the protrusions 25da, 25db, and 25dc are provided, the aperture blades 24 are lifted in the optical axis X direction toward the base of the cam pins 22d, compared to when this protrusions are not provided. In other words, the engagement, penetration, or overlapping amount of the cam pins 22d and cam grooves 24d in the optical axis X direction increases by the height of the protrusions 25da, 25db, and 25dc from the reference surface 25h in the optical axis X direction.

Here, the same effect can be obtained even if the thickness of the entire cover 25 in the optical axis is increased by the height of the protrusions 25da, 25db, 25dc, that is, if the reference surface 25h is lifted to the height of the three protrusions 25da, 25db, 25dc. In this case, however, the entire storage space S1 of the aperture blades 24 will be narrower in the optical axis X direction, so if the aperture blades 24, the base plate 21, the drive ring 22, and the cover 25 become warped or otherwise deformed due to manufacturing problems, there may not be enough space for the aperture blades 24 to move, resulting in malfunction of the aperture blades 24. Also, if the thickness of the entire cover 25 in the optical axis X direction is increased by the height of the protrusions 25da, 25db, and 25dc, that is, if the reference surface 25h is lifted to the height of the three protrusions 25da, 25db, and 25dc, the surface area of the contact surface between the aperture blades 24 and the cover 25 will end up being larger, so there will be an increase in the frictional force itself due to contact, or in the variance in the amount of friction, or the aperture blade 24 will be more susceptible to the influence of static electricity, which may cause malfunction.

Consequently, even if, for example, the aperture blades 24 move toward the image plane in the storage space S1 in the optical axis X direction, or if the drive ring 22 moves away from the cover 25 in the optical axis X direction due to play, that is, clearance, or if the base plate 21 or the cover 25 is deformed due to the application of an external force such as impact, causing the amount of engagement in the optical axis X direction between the cam pins 22d and the cam grooves 24d to be smaller than in the state shown in FIG. 13, there will still be enough engagement between the cam pins 22d and the cam grooves 24d to make it unlikely that the cam pins 22d of the drive ring 22 will some out of the cam grooves 24d of the aperture blades 24 so that opening and closing operation is impossible.

Also, the aperture blades 24 are each supported at three points in the lengthwise direction of the radial direction centered on the optical axis X by the three protrusions 25da, 25db, and 25dc. Therefore, compared to when there are no protrusions on the aperture blade 24 side of the cover 25 and support is through contact over a flat surface, there will be less resistance during the opening and closing of the aperture blades 24.

As shown in FIG. 10, the protrusions 25da are provided at positions adjacent to the outside of the concave portion 25c in the radial direction, and support the surface on the image plane side near the cam grooves 24d further to the outside diameter side than the engaged portions of the cam pins 22d in the cam grooves 24d on the first end 24e side of the aperture blades 24 (see FIG. 13). This restricts the height of the aperture blades 24 in the optical axis X direction near the engaged portions of the cam grooves 24d with the cam pins 22d, which is where the cam pins 22d of the drive ring 22 come out, and therefore this is every effective at preventing the pins from coming out.

Also, as shown in FIG. 10, the protrusion 25db is disposed adjacent to the concave portions 25c further to the inside diameter side than the protrusions 25da and the concave portions 25c, and is disposed on the opposite side with the concave portions 25c sandwiched in between in the radial direction, and supports the surface of the aperture blades 24 on the image plane side further to the radially inner side than the engaged portions of the cam grooves 24d and the cam pins 22d of the aperture blade 24 (see FIG. 13). This restricts the height in the optical axis X direction of the aperture blades 24 on both sides near the outside and inside in the radial direction of the engaged portions of the cam grooves 24d and the cam pins 22d, which is where the cam pins 22d of the drive ring 22 come out, so this even more effective at preventing the cam pins 22d from coming out of the cam grooves 24d.

Here, the concave portions 25c have a bottom wall provided at a position opposite the distal ends of the cam pins 22d on the drive ring 22 side, a specific distance away from the distal ends of the cam pins 22d so as not to affect the operation. This bottom wall is integrally molded with the cover 25, and a specific thickness is ensured so as not to affect the strength or moldability of the cover 25. The concave portions 25c thus serve as grooves that do not pass through in the optical axis X direction. If this bottom wall is removed to form through-holes, the amounts of engagement, penetration, or overlap in the optical axis X direction of the cam pins 22d and the cam grooves 24d can be increased by the thickness of the removed bottom portion, without having to change the dimensions of the aperture unit 20 in the optical axis X direction, that is, without increasing its size. However, in this case, dirt or foreign matter may infiltrate the aperture unit 20 through the through-holes formed as a result of removing the bottom wall, and conversely, dirt or foreign matter may be discharged from the aperture unit 20. If dirt or foreign matter infiltrates the aperture unit 20, there is the risk that the dirt or foreign matter will be diffused into the lens barrel 10, resulting in a poor appearance. Conversely, if dirt or foreign matter is discharged from inside the aperture unit 20, there is the risk that the aperture blades 24 will not function properly. Consequently, employing the configuration of this embodiment reduces the size of the aperture unit 20 while preventing dirt and foreign matter from going in and out of the aperture unit 20.

As shown in FIG. 13, the three protrusions 25da, 25db, and 25dc are formed to have a rounded shape, a curved shape, or a sloped shape in a cross-sectional view in the radial direction of a circle centered on the optical axis X.

Furthermore, the protrusions 25da adjacent to the outside of the concave portions 25c in the radial direction are divided up into nine arcuate parts along the circumferential direction, rather than being in an annular shape centered on the optical axis X as is the protrusion 25db. This is because the protrusions 25da are disposed on the outside diameter side in the radial direction of a circle centered on the optical axis of the base plate 21, so other structures that are near the protrusions 25da or are present in substantially the same diameter centered on the optical axis X as the protrusions 25da, such as a relief hole in the rotation shaft 21e, become obstacles, making it difficult link them in an annular shape. The protrusions 25da are disposed on the outermost radial side in the radial direction of a circle centered on the optical axis X, out of the three different protrusions described above.

Since the protrusions 25da are divided into nine arcuate parts, this ends up resulting in an angular shape in the circumferential direction of a circle centered on the optical axis X of each protrusion 25da. This angular shape may catch on the edges at the ends of the main body portions 24a of the aperture blades 24 when the aperture blades 24 rotate during opening and closing. To avoid this, the protrusions 25da are formed to have a rounded shape, a curved shape, or a sloped shape in a cross-sectional view in the circumferential direction of a circle centered on the optical axis X, just as in the radial direction. Consequently, the protrusions 25da will not catch even if the aperture blades 24 approach, make contact, or collide from either the circumferential direction or the radial direction of a circle centered on the optical axis X.

The protrusions 25da are formed so as to be in left and right asymmetry in the radial direction centered on the optical axis X in a cross-sectional view in the radial direction of a circle centered on the optical axis X shown in FIG. 13. More precisely, the surface of a protrusion 25da that slopes downward toward the inside in the radial direction is wider than the surface that slopes downward toward the outside in the radial direction. In other words, in the cross-sectional view shown in FIG. 13, the angle formed by the tangent of a protrusion 25*da* and an aperture blade 24 is asymmetric between the outside and inside in the radial direction. In the radial direction centered on the optical axis X, the tangent angle of the inner surface is smaller than the tangent angle of the outer surface. More specifically, the angle formed by the tangent and the aperture blade 24 is preferably 45° or less, more preferably 30° or less.

As a result, even when the opening or closing of the aperture blades 24 causes them to rotate around the rotation shaft 21*e*, and the edges of the end of the main body portion 24*a* of the aperture blades 24 come into contact with the protrusions 25*da*, 25*db*, and 25*dc*, the portions of the aperture blades 24 around the cam grooves 24*d*, etc., will not catch on anything, allowing the aperture blades 24 to rotate smoothly and preventing malfunction of the aperture blades 24.

Coupling of Base Plate 21 and Drive Ring 22

In the aperture unit 20 of this embodiment, a bayonet connection is employed in for attaching the drive ring 22 to the base plate 21 in a state that allows removal from the base plate 21 in the optical axis X direction and also allows rotation around the optical axis X.

That is, in a state in which the drive ring 22 has been attached to the base plate 21, such as when the aperture blades 24 are in the open aperture state, as shown in FIG. 14A, the latching portions 21*g* of the base plate 21 described above are unable to ride up and over the latched portions 22*g* of the drive ring 22, so the drive ring 22 cannot move relative to the base plate 21 in the optical axis X direction.

Figure 15:
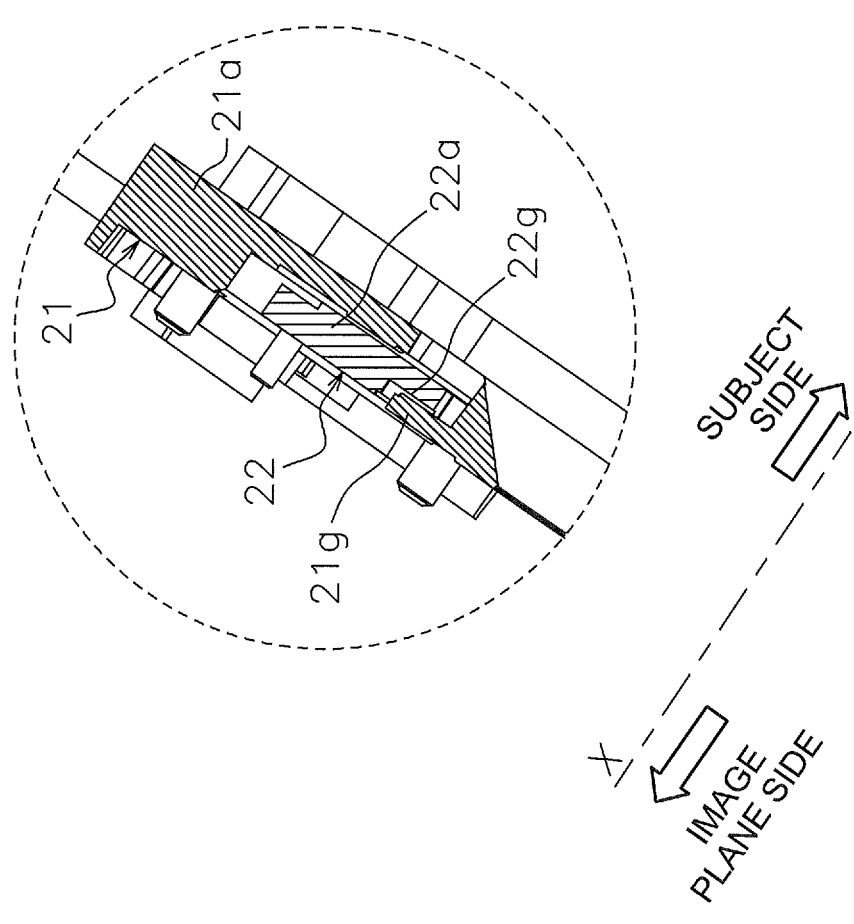
FIG. 15 is a detail view of the D portion in FIG. 14B.

At this point, as shown in FIG. 15, which is a detail view of the D portion in FIG. 14B, which is a cross-sectional view along the C-C line in FIG. 14A, the drive ring 22 is located such that the latched portions 22*g* of the drive ring 22 go under the latching portions 21*g* of the base plate 21, which restricts movement in the optical axis X direction. In other words, the drive ring 22 is held on the base plate 21 such that the latched portions 22*g* are sandwiched between the latching portions 21*g* of the base plate 21 and the bottom surface of the annular recess 21*h*, and their positions in the optical axis X direction are restrained, while rotation around the optical axis X is still possible.

Consequently, the drive ring 22 can be attached to the base plate 21 while still being able to rotate around the optical axis X within a specific range.

Figure 16B:
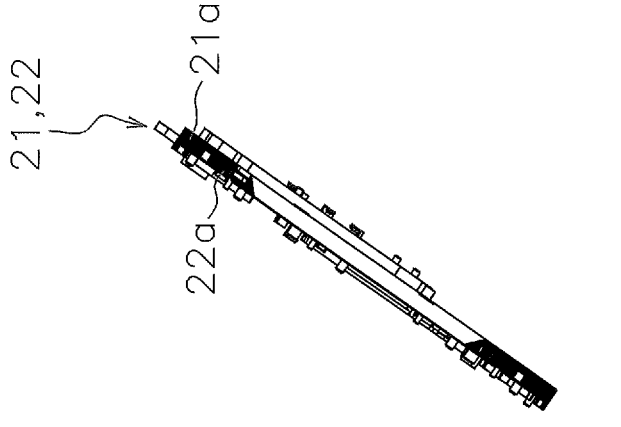
FIG. 16B is a cross-sectional view along the E-E line in FIG. 16A.
Figure 16A:
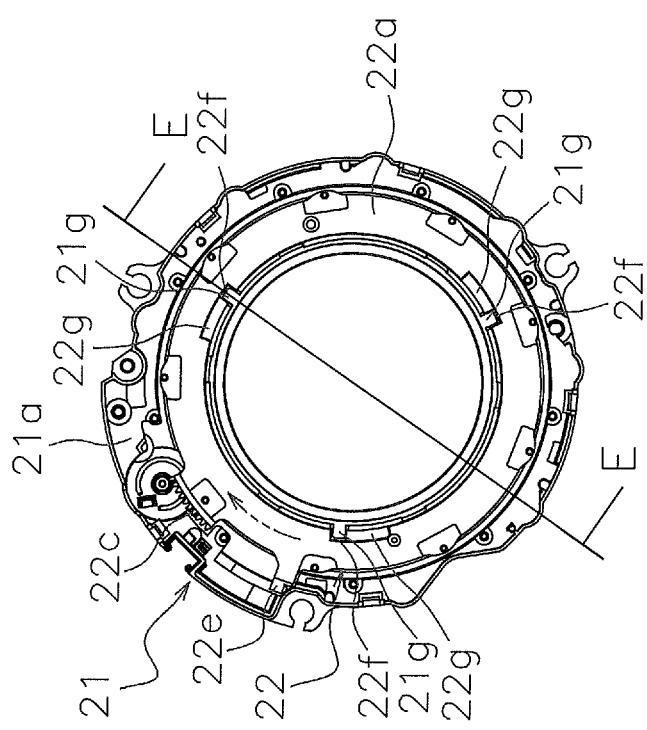
FIG. 16A is a plan view showing the phase when assembling the base plate of FIG. 4A and the drive ring of FIG. 5A.

On the other hand, in attaching the drive ring 22 to the base plate 21, as shown in FIG. 16A, the positions of the three latching portions 21*g* on the base plate 21 side and the positions of the three latching grooves 22*f* on the drive ring 22 side are aligned as viewed in the optical axis X direction. That is, the angles of the three latching portions 21*g* and angles of the three latching grooves 22*f*, centered on the optical axis X, are aligned. Then, in this state, the drive ring 22 is moved relative to the base plate 21 in the optical axis X direction, and the drive ring 22 is fitted into the annular recess 21*h* of the base plate 21, as shown in FIG. 16B.

Then, the drive ring 22 is rotated in the direction of the one-dot chain line arrow shown in FIG. 16A, so that the latching portions 21*g* of the base plate 21 ride up onto the latched portions 22*g* of the drive ring 22, resulting in a latched state in the optical axis X direction, and forming the coupled state shown in FIG. 15.

Figure 17:
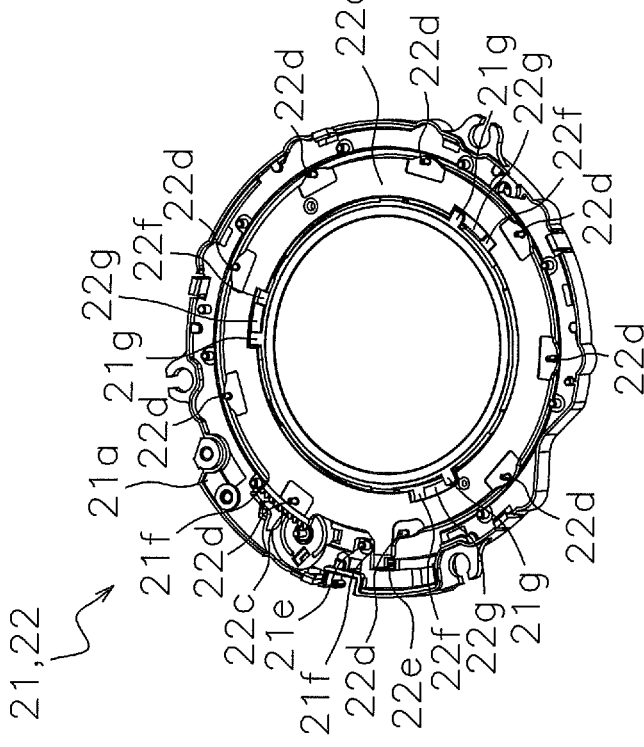
FIG. 17 is an oblique view showing the positional relation (phase) when the opening of the aperture unit is maximized (opened) in a state in which the base plate of FIG. 4A and the drive ring of FIG. 5A have been assembled and bayonet-coupled.

Here, when the drive ring 22 is rotationally driven by the drive motor 28 and rotates to the mechanical end position on the open side (open aperture side) where the aperture opening is open, the side surface of the gear portion 22*c* of the drive ring 22 hits the stopper 21*f* as shown in FIG. 17. At this point, the latching portions 21*g* on the base plate 21 side are still positioned above the latched portions 22*g* on the drive ring 22 side. Therefore, even if the drive ring 22 is rotated to the open end (open aperture end, maximum opening end) after the drive ring 22 has been attached to the base plate 21, the drive ring 22 will not come off the base plate 21.

Next, the mechanical end of the drive ring 22 on the side where the aperture opening is at its smallest will be described through reference to FIGS. 18 to 19B.

With the aperture unit 20 in this embodiment, the mechanical end of the drive ring 22 on the side where the aperture opening is at its smallest (minimum aperture side) is formed by the stopper 25*g* provided on the cover 25 side, rather than on the base plate 21 side.

Figure 18:
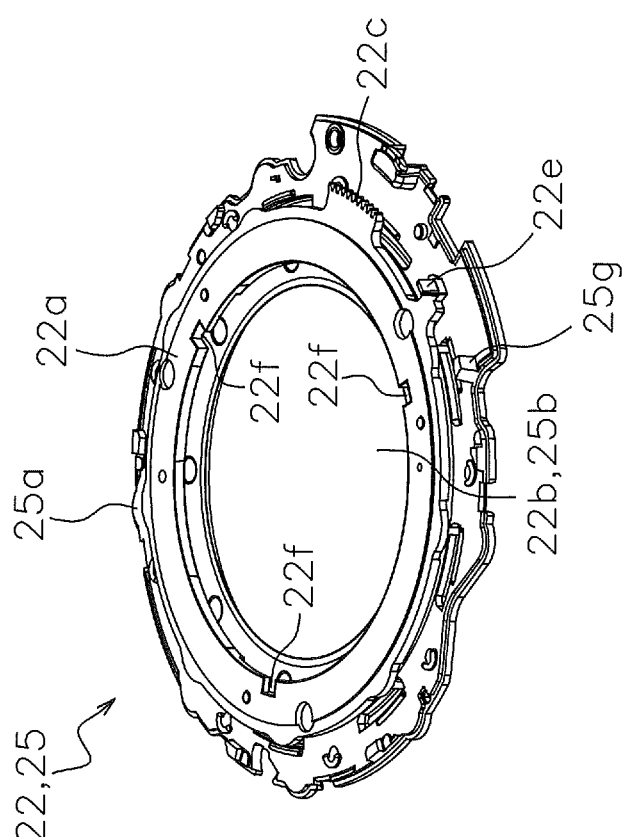
FIG. 18 is an oblique view showing the positional relation (phase) when the drive ring of FIG. 5A and the cover of FIG.

That is, as shown in FIG. 18, the drive ring 22 disposed between the base plate 21 and the cover 25 does not come into contact with any part of the cover 25 in the rotational direction when the aperture opening is in its open state (open aperture state, maximum aperture state; see FIG. 17).

On the other hand, when the drive ring 22 is rotated in the direction in which the aperture opening of the drive ring 22 is minimized, as shown in FIGS. 19A and 19B, the side surface on which the light shielding blade 22*e* of the drive ring 22 is formed and which is formed in the radial direction around the optical axis X on the protrusion 22*h* that protrudes outward in the radial direction from the main body portion 22*a*, hits the stopper 25*g* on the cover 25 side, rather than on the base plate 21 side.

Consequently, a member on the cover 25 side (the stopper 25*g*) can form the mechanical end of the drive ring 22 on the minimum aperture side.

Here, the contact member on the drive ring 22 side is the light shielding blade 22*e*, and the photointerrupter 29*a* senses the position of the drive ring 22 on the basis of the position of the light shielding blade 22*e*. Accordingly, by bringing the side surface of the convex portion where the light shielding blade 22*e* is provided into contact with the stopper 25*g* to form the mechanical end, the positional accuracy and control accuracy in the rotation direction of the drive ring 22 can be improved over those in the past.

When the drive ring 22 is at the end (mechanical end) at either side (open aperture side and minimum aperture side) of its rotational range, the drive ring 22 can be kept coupled to the base plate 21.

That is, in a state in which the drive ring 22 has rotated to the end on the side where the aperture opening is open, as shown in FIG. 20A, the phases (positions in the circumferential direction) of the latching portions 21*g* on the base plate 21 side and the latched portions 22*g* of the drive ring 22 are offset, and the base plate 21 and the drive ring 22 are maintained in their coupled state.

On the other hand, in a state in which the drive ring 22 has rotated to the end where the aperture opening is at its smallest, as shown in FIG. 20B, the positions of the latching portions 21*g* on the base plate 21 side and the latching grooves 22*f* on the drive ring 22 side are closer, but since a part of the latching portions 21*g* catches on the ends of the latched portions 22*g*, the coupled state is maintained between the base plate 21 and the drive ring 22.

Addenda

With a conventional configuration, there was the risk that the movable blades that perform opening and closing operations in a storage space formed between a first frame and a second frame would not be able to rotate smoothly within the storage space.

In view of this, a light shielding unit according to another disclosure comprises a first frame body, a second frame body, a plurality of movable blades, a drive ring, a drive source, and a plurality of rotation shafts. The first frame body has a substantially annular main body portion and a first opening that is provided at the center of the main body portion and allows light to pass through in the optical axis direction. The second frame body has a substantially annular main body portion and a second opening that is provided at the center of the main body portion and allows light to pass through in the optical axis direction. The movable blades are disposed between the first frame body and the second frame body, form a third opening through which passes the light that has passed through the first opening, and adjust the amount of light transmitted by varying the size of the third opening through opening and closing operations, and each have a through-hole into which a rotation shaft serving as the center of rotation is inserted when performing an opening or closing operation, and a cam groove. The drive ring is disposed between the first frame body and the second frame body, and is rotationally driven when the movable blades are opened or closed, and also has a plurality of cam pins that move along the cam grooves of the movable blades. The drive source rotationally drives the drive ring around the optical axis. The rotation shafts are inserted into the through-holes of the movable blades and serve as center of rotation for the movable blades. The second frame body further has a support portion that protrudes in the direction of the movable blades along the optical axis direction and supports the surface on which the movable blades slide during opening and closing operations.

Also, with a conventional configuration, it was sometimes difficult for the movable blades that perform opening and closing operations in a storage space formed between a first frame and a second frame to avoid interfering with various parts within the storage space.

In view of this, the light shielding unit according to yet another disclosure comprises a first frame body, a second frame body, a plurality of movable blades, a drive ring, a drive source, and a plurality of rotation shafts. The first frame body has a substantially annular main body portion and a first opening that is provided at the center of the main body portion and allows light to pass through in the optical axis direction. The second frame body has a substantially annular main body portion and a second opening that is provided at the center of the main body portion and allows light to pass through in the optical axis direction. The movable blades are disposed between the first frame body and the second frame body, form a third opening through which passes the light that has passed through the first aperture, and adjust the amount of light transmitted by varying the size of the third opening through opening and closing operations. The drive ring is disposed between the first frame body and the second frame body, and is rotationally driven when the movable blades are opened or closed. The drive source rotates the drive ring around the optical axis. The rotation shafts serve as the center of rotation for the movable blades. The movable blades each have a second width portion that is smaller than the first width portion of the first end, and a third width portion that is wider than the second width portion, from the first end side where the rotation shaft is provided toward the second end side that advances toward the third opening side in a closed state.

Furthermore, with a conventional configuration, there was the risk that the sensing accuracy would be insufficient in sensing the rotational position of the drive ring, which is rotatably enclosed between the first frame body and the second frame body.

Furthermore, a light shielding unit according to another disclosure comprises a first frame body, a second frame body, a plurality of movable blades, a drive ring, a drive source, a light shielding unit, a position sensing unit, and a rotation restricting unit. The first frame body has a substantially annular main body portion and a first opening that is provided at the center of the main body portion and allows light to pass through in the optical axis direction. The second frame body has a substantially annular main body portion and a second opening that is provided at the center of the main body portion and allows light to pass through in the optical axis direction. The movable blades are disposed between the first frame body and the second frame body, form a third opening through which passes the light that has passed through the first opening, and adjust the amount of light transmitted by varying the size of the third opening through opening and closing operations. The drive ring is disposed between the first frame body and the second frame body, and is rotationally driven when the movable blades are opened or closed, and also has substantially annular main body portion and a second protrusion that protrudes outward in the radial direction of a circle centered on the optical axis from the outer periphery of the main body portion. The drive source rotationally drives the drive ring. The light shielding unit is fixed to the second protrusion so as to protrude in the optical axis direction. The position sensing unit detects the light shielding unit and senses the rotational position of the drive ring. The rotation restricting unit is provided to the second frame and hits the second protrusion of the drive ring to restrict the rotational range of the drive ring.

Other Embodiments

An embodiment of the present disclosure was described above, but the present disclosure is not limited to or by the above embodiment, and various changes are possible departing from the gist of the disclosure.

(A)

In the above embodiment, an example was given in which the three protrusions 25*da,* 25*db,* and 25*dc* provided to the cover 25 supported the surface of the aperture blades 24 on the image plane side within the storage space S1 formed between the base plate 21 and the cover 25. However, the present disclosure is not limited to this.

For example, the surface of the aperture blades (movable blades) on the image plane side may be supported at two points, or at four or more points.

(B)

In the above embodiment, an example was given in which the base plate 21 and the cover 25 had the convex portions 21*c* and 25*e* formed along the outer shape on the outside in the radial direction of a circle centered on the optical axis X of the aperture blades 24, in a state in which the drive ring 22 was rotationally driven so that the aperture blades 24 rotated until the opening 24*b* reached its smallest size. However, the present disclosure is not limited to this.

For example, if just one member constitutes the outer shape of the aperture unit, convex portions may be provided just to that member.

(C)

In the above embodiment, an example was given in which the base plate 21 and the cover 25 had the concave portions 21*d* and 25*f* formed along the outer shape on the outside in the radial direction of a circle centered on the optical axis X of the aperture blades 24, in a state in which the drive ring 22 was rotationally driven so that the aperture blades 24 rotated until the opening 24*b* reached its smallest size. However, the present disclosure is not limited to this.

For example, if just one member constitutes the outer shape of the aperture unit, concave portions may be provided just to that member.

(D)

In the above embodiment, an example was given in which the rotation shafts 21*e*, which are the rotation shafts of the plurality of aperture blades 24, was provided on the base plate 21 side. However, the present disclosure is not limited to this.

For example, the rotation shafts of the aperture blades (movable blades) may be provided on a side other than the base plate (first frame body) side, such as on the cover (second frame body).

(E)

In the above embodiment, an example was given in which the cam pins 22*d* that engaged with the cam grooves 24*d* of the aperture blades 24 were provided on the drive ring 22 side. However, the present disclosure is not limited to this.

For example, the cam pins that engage with the cam grooves of the aperture blades (movable blades) may instead be provided on a side other than the drive ring, such as on the base plate (first frame body) side or on the front cover (second frame body) side.

(F)

In the above embodiment, an example was given in which the aperture unit 20 included nine movable aperture blades 24. However, the present disclosure is not limited to this.

For example, the number of movable blades included in the aperture unit is not limited to nine, and may instead be eight or fewer, or ten or more.

(G)

In the above embodiment, an example was given in which the present disclosure was applied to the aperture unit 20 (light shielding unit) mounted on the interchangeable lens type of lens barrel 10, which is detachable from the camera body. However, the present disclosure is not limited to this.

For example, the present light shielding unit can also be applied to a lens barrel that is integrated with a camera body, rather than to an exchangeable lens barrel.

(H)

In the above embodiment, an example was given in which the present disclosure was applied to the aperture unit (light shielding unit) 20 mounted on the lens barrel 10 that was disposed downstream in the light incidence direction of the fourth lens L4 functioning as a focus lens. However, the present disclosure is not limited to this.

The aperture unit may be disposed upstream in the light incidence direction of the fourth lens L4, which functions as a focus lens.

In this case, the focus lens is disposed in the direction in which the aperture blades warp upward, and there is a concern about interference between the aperture blades and the focus lens during focusing, but if the present disclosure is applied, the amount of warpage of the aperture blades can be suppressed, so there is less risk of interference.

(I)

In the above embodiment, an example was given in which the cam pins 22*d* that engaged with the cam grooves 24*d* of the aperture blades 24 were provided on the drive ring 22 side. However, the present disclosure is not limited to this.

For example, the engaging cam pins may be disposed on the aperture blade (movable blade) side, and the cam grooves may be disposed on the drive ring side, the base plate side, or the cover side.

Here again, the same effect can be obtained as in the above embodiment.

(J)

In the above embodiment, an example was given in which the rotation shafts 21*e*, which were the rotation shafts of the aperture blades 24, were provided on the base plate 21 side. However, the present disclosure is not limited to this.

For example, the rotation shafts of the aperture blades (movable blades) may be disposed on a side other than that of the base plate (first frame body), such as being integrally disposed on the aperture blades (movable blades) themselves, and holes that engage with these shafts may be provided on the base plate side.

Here again, the same effect can be obtained as in the above embodiment.

INDUSTRIAL APPLICABILITY

Since the light shielding unit of the present disclosure exhibits the effect of having a smaller size than a conventional unit, it can be broadly applied to various devices such as optical equipment equipped with a light shielding unit.

REFERENCE SIGNS LIST

10 lens barrel
11 outer frame
12 inner frame
13 actuator
14 guide pole
15 fourth lens frame
16 mount
20 aperture unit (light shielding unit)
21 base plate (first frame body)
21*a* main body portion
21*b* opening (first opening)
21*c* convex portion (first convex portion)
21*d* concave portion (first concave portion)
21*e* rotation shaft
21*f* stopper
21*g* latching portion
21*h* annular recess
22 drive ring
22*a* main body portion
22*b* opening (second opening)
22*c* gear portion
22*d* cam pin
22*e* light shielding blade (light shielding portion)
22*f* latching groove
22*g* latched portion
22*h* protrusion (second protrusion)
23 aperture sheet
23*a* main body portion
23*b* opening
23*c* through-groove
24 aperture blade (movable blade)
24*a* main body portion
24*b* opening (third opening)
24*c* through-hole
24*d* cam groove
24*e* first end
24*f* second end
24*g* large curvature portion of cam groove 24*h* small curvature portion or substantially straight portion of cam groove
24*i* large curvature portion of the aperture blade outer shape
24*j* small curvature portion or substantially straight portion of aperture blade outer shape
25 cover (second frame body)
25*a* main body portion
25*b* opening (second opening)
25*c* concave portion
25*da* protrusion (first protrusion, support portion)
25*db* protrusion (first protrusion, support portion)
25*dc* protrusion (first protrusion, support portion)
25*e* convex portion (second convex portion)
25*f* concave portion (second concave portion)
25*g* stopper (rotation restricting portion)
25*h* reference surface
28 drive motor (drive source)
28*a* reduction gear
29*a* photo interrupter (position sensing unit)
29*b* FPC
d1 width (first width portion)
d2 width (second width portion)
d3 width (third width portion) (large width portion)
d4 width (fourth width portion) (narrow width portion)
d5 width (fifth width portion) (large width portion)
L1 to L5 first to fifth lenses
S1 storage space
X optical axis

The invention claimed is:

1. A light shielding unit, comprising:
a first frame having a substantially annular main body and a first opening that is provided to a center portion of the main body and configured to allow light to pass through along an optical axis direction;
a second frame having a substantially annular main body and a second opening that is provided to the center portion of the main body and configured to allow light to pass through along the optical axis direction;
a plurality of movable blades that are disposed between the first frame and the second frame, that form a third opening through which the light that has passed through the first opening passes, configured to adjust an amount of light passing through by varying a size of the third opening by opening and closing operations;
a drive ring that is disposed between the first frame and the second frame and configured to be rotationally driven when the plurality of movable blades are opened and closed;
a drive source configured to rotationally drive the drive ring around an optical axis; and
a plurality of rotation shafts that are configured to serve as the center of rotation of the plurality of movable blades,
wherein the second frame further has first protrusions that protrude in a direction of the movable blades along the optical axis direction, and is configured to restrict a movement of the plurality of movable blades in the optical axis direction, and
wherein the movable blade has a cam groove,
the drive ring has a cam pin configured to engage the cam groove and move, and
the first protrusions are provided near the cam groove in which the cam pin for opening and closing the movable blade is inserted.

2. The light shielding unit according to claim 1,
wherein the first protrusion is formed between the first frame and the second frame, and protrudes toward a storage space in which the movable blades are housed in a state in which the third opening is open.

3. The light shielding unit according to claim 1,
wherein a plurality of the first protrusions are provided along a radial direction of a circle centered on the optical axis.

4. A lens barrel, comprising:
the light shielding unit according to claim 1; and
a plurality of lens groups configured to guide a light incident on the light shielding unit in a desired direction.

5. The lens barrel according to claim 4,
wherein the light shielding unit is an aperture unit configured to adjust an amount of the light that passes through the plurality of lens groups.

6. The light shielding unit according to claim 1,
wherein the second frame has a recess into which a tip of the cam pin is inserted, and
the first protruding portion is disposed adjacent to the recess.

7. The light shielding unit according to claim 6,
wherein the first protruding portion includes an inner diameter side protruding portion disposed adjacent to the recess in a radial direction centered on the optical axis, and
an outer diameter side protruding portion disposed on the opposite side in the radial direction centered on the optical axis with the recess interposed therebetween.

8. A light shielding unit, comprising:
a first frame having a substantially annular main body and a first opening that is provided to a center portion of the main body and configured to allow light to pass through along an optical axis direction;
a second frame having a substantially annular main body and a second opening that is provided to the center portion of the main body and configured to allow light to pass through along the optical axis direction;
a plurality of movable blades that are disposed between the first frame and the second frame, that form a third opening through which the light that has passed through the first opening passes, and configured to adjust an amount of light passing through by varying a size of the third opening by opening and closing operations, and having a cam groove;
a drive ring that is disposed between the first frame and the second frame and configured to be rotationally driven when the plurality of movable blades are opened and closed; and
a drive source configured to rotationally drive the drive ring around an optical axis,
wherein the first frame further has a first outer shape portion that conforms to substantially parallel to the cam grove in a state in which the third opening is reduced to its smallest size by a rotation of the movable blades when the drive ring is rotationally driven by the drive source.

9. The light shielding unit according to claim 8,
wherein the second frame further has a second convex portion that conforms to the external shape on the outside in the radial direction of a circle centered on the optical axis of the movable blades in a state in which the third opening is reduced to its smallest size by the rotation of the movable blades when the drive ring is rotationally driven by the drive source.

10. The light shielding unit according to claim 8,
wherein the first outer shape portion is formed so that a part thereof protrudes outward in a radial direction from an outer peripheral portion of the substantially circular outer shape of the main body portion centered on the optical axis.

11. The light shielding unit according to claim 8, wherein the first outer shape portion is formed so that a part thereof is recessed inward in a radial direction from an outer peripheral portion of a substantially circular outer shape of the main body portion centered on the optical axis.

12. The light shielding unit according to claim 8, wherein the first outer shape portion has a first radial protruding portion formed so that a part thereof protrudes outward in a radial direction from an outer peripheral portion of a substantially circular outer shape of the main body portion centered on the optical axis, and a first radial recessed portion formed so that a part thereof is recessed inward in the radial direction from an outer peripheral portion of a substantially circular outer shape of the main body portion centered on the optical axis.

13. The light shielding unit according to claim 8, wherein the first outer shape portion is a convex portion.

14. A light shielding unit, comprising:

a first frame having a substantially annular main body and a first opening that is provided to a center portion of the main body and configured to allow light to pass through along an optical axis direction;

a second frame having a substantially annular main body and a second opening that is provided to the center portion of the main body and configured to allow light to pass through along the optical axis direction;

a plurality of movable blades that are disposed between the first frame and the second frame, that form a third opening through which the light that has passed through the first opening passes, and configured to adjust an amount of light passing through by varying a size of the third opening by opening and closing operations;

a drive ring that is disposed between the first frame and the second frame and configured to be rotationally driven when the plurality of movable blades are opened and closed;

a drive source configured to rotationally drive the drive ring around an optical axis; and a plurality of rotation shafts configured to serve as a center of rotation of the plurality of movable blades, wherein the movable blades each have a second width portion in which a width is less than in a first width portion of a first end, and a third width portion in which the width is greater than in the second width portion, going from a first end side where the rotation shaft is provided toward a second end side that expands out toward a side of the third opening in a closed state, and at least a part of the first width portion or at least a part of the third width portion maintain an overlapping state in the optical axis direction with the adjacent movable blade while the third opening changes its size, and the second width portion does not maintain an overlapping state in the optical axis direction with the adjacent movable blade in at least one state while the third opening changes its size.

15. The light shielding unit according to claim 14, wherein, in a state in which the plurality of movable blades have rotated and the third opening has been reduced to its minimum, the third width portion is in a state of overlapping the adjacent movable blade, and an order in which the plurality of movable blades are disposed is maintained.

16. The light shielding unit according to claim 14, wherein the movable blades further have a fourth width portion in which the width is less than in the third width portion, going from the first end side where the rotation shaft is provided toward the second end side that expands out toward the third opening side in a closed state.

17. The light shielding unit according to claim 14, wherein the second width portion is disposed closer to a substantially radial inner side centered on the optical axis than the cam pin for rotationally driving the adjacent movable blade, in at least one state while the third opening changes its size.

18. The light shielding unit according to claim 17, wherein In the fully open state of the third opening, an outer diameter side outer shape of the movable blade centered on the optical axis, as viewed from the optical axis direction, is such that the second width portion has a shape that is relatively recessed with respect to the first width portion and the third width portion, and is smoothly connected by a continuous curve or straight line.

* * * * *